(12) United States Patent
Peng et al.

(10) Patent No.: US 12,446,004 B2
(45) Date of Patent: Oct. 14, 2025

(54) METHOD FOR DETERMINING SIDELINK RESOURCE AND TERMINAL

(71) Applicant: VIVO MOBILE COMMUNICATION CO., LTD., Dongguan (CN)

(72) Inventors: Shuyan Peng, Dongguan (CN); Zichao Ji, Dongguan (CN); Huaming Wu, Dongguan (CN); Wei Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 396 days.

(21) Appl. No.: 17/702,751

(22) Filed: Mar. 23, 2022

(65) Prior Publication Data
US 2022/0217682 A1 Jul. 7, 2022

Related U.S. Application Data

(63) Continuation of application No. PCT/CN2020/118072, filed on Sep. 27, 2020.

(30) Foreign Application Priority Data

Sep. 30, 2019 (CN) .......................... 201910943831.5

(51) Int. Cl.
*H04W 72/02* (2009.01)
*H04W 72/044* (2023.01)
(Continued)

(52) U.S. Cl.
CPC ......... *H04W 72/02* (2013.01); *H04W 72/044* (2013.01); *H04W 72/20* (2023.01); *H04W 92/18* (2013.01)

(58) Field of Classification Search
None
See application file for complete search history.

(56) References Cited

U.S. PATENT DOCUMENTS 11,736,232 B2 * 8/2023 Nimbalker ............ H04L 1/1822
370/329
11,811,536 B2 * 11/2023 Karaki .................. H04L 1/1812
(Continued)

FOREIGN PATENT DOCUMENTS

| CN | 106793092 A | 5/2017 |
|---|---|---|
| CN | 107431909 A | 12/2017 |

(Continued)

OTHER PUBLICATIONS

International Search Report issued in corresponding International Application No. PCT/CN2020/118072, mailed Dec. 30, 2020, 4 pages.
(Continued)

*Primary Examiner* — Eunsook Choi
(74) *Attorney, Agent, or Firm* — IPX PLLC

(57) ABSTRACT

Embodiments of the present disclosure provide methods and terminals for determining a sidelink resource. An exemplary method includes determining, according to at least one of a frequency domain resource of SCI and frequency domain resource indication information carried by the SCI, a frequency domain resource of a target resource indicated by the SCI. The method also includes determining, according to at least one of a time domain resource of the SCI and time domain resource indication information carried by the SCI, a time domain resource of a target resource indicated by the SCI.

20 Claims, 8 Drawing Sheets

```
┌────────────────────────────────────────────────┐
│ Determine, according to at least one of a      │
│ frequency domain resource of SCI and           │
│ frequency domain resource indication           │──── 21
│ information carried by the SCI, a frequency    │
│ domain resource of a target resource           │
│ indicated by the SCI                           │
└────────────────────────────────────────────────┘
                       │
                       ▼
┌────────────────────────────────────────────────┐
│ Determine, according to at least one of a      │
│ time domain resource of the SCI and time       │
│ domain resource indication information         │──── 21
│ carried by the SCI, a time domain resource of  │
│ a target resource indicated by the SCI         │
└────────────────────────────────────────────────┘
```

(51) Int. Cl.
*H04W 72/20* (2023.01)
*H04W 72/04* (2023.01)
*H04W 92/18* (2009.01)

(56) References Cited

U.S. PATENT DOCUMENTS

| | | | |
|---|---|---|---|
| 11,832,260 B2* | 11/2023 | Lu | H04W 72/25 |
| 11,956,680 B2* | 4/2024 | Yang | H04W 72/52 |
| 2020/0260386 A1* | 8/2020 | Ryu | H04W 76/14 |
| 2021/0099918 A1* | 4/2021 | Sarkis | H04W 72/0453 |
| 2021/0211246 A1* | 7/2021 | Xiang | H04L 5/0044 |

FOREIGN PATENT DOCUMENTS

| | | |
|---|---|---|
| CN | 107734548 A | 2/2018 |
| WO | 2018174661 A1 | 9/2018 |
| WO | 2018219485 A1 | 12/2018 |

OTHER PUBLICATIONS

3GPP, "3rd Generation Partnership Project; Technical Specification Group Radio Access Network; Evolved Universal Terrestrial Radio Access (E-UTRA); Physical layer procedures(Release 15)", 3GPP TS 36.213 V15.7.0 (Sep. 2019), Sep. 28, 2019.
First Office Action issued in related Chinese Application No. 201910943831.5, mailed Jan. 18, 2022, 8 pages.
Extended European Search Report issued in related European Application No. 20872415.3, mailed Oct. 6, 2022, 13 pages.
Spreadtrum Communications, "Discussion on physical layer structure for sidelink" 3GPP TSG RAN WG1#98, R1-1908947, Aug. 2019, 16 pages.
Intel Corporation, "Summary#4 for AI 7.2.4.2.2 Mode-2 Resource Allocation", 3GPP TSG RAN WG1 Meeting #98, R1-1909892, Aug. 2019, 34 pages.
Third Office Action issued in related Chinese Application No. 201910943831.5, mailed Oct. 31, 2022, 9 pages.
Kyocera, "Sidelink Physical Layer Structure", 3GPP TSG RAN WG1#98, R1-1909015, Aug. 2019, 7 pages.

* cited by examiner

METHOD FOR DETERMINING SIDELINK RESOURCE AND TERMINAL

CROSS-REFERENCE TO RELATED APPLICATIONS

This application is a continuation of International Application No. PCT/CN2020/118072 filed Sep. 27, 2020, which claims priority to Chinese Patent Application No. 201910943831.5, filed on Sep. 30, 2019 in China, both of which are incorporated herein by reference in their entireties.

TECHNICAL FIELD

Embodiments of the present disclosure relate to the field of wireless communications technologies, and in particular to a method for determining a sidelink resource and a terminal.

BACKGROUND

A Long Term Evolution (LTE) system starts to support a sidelink (sidelink) from a release 12, and the sidelink is used for direct data transmission between User Equipment (UE) without using a network side device.

The design of an LTE sidelink applies to specific public safety affairs (such as emergency communication in a fire disaster place or an earthquake disaster place), vehicle to everything (V2X) communication, or the like. The vehicle to everything communication includes various services, for example, basic safety-related communication, advanced (autonomous) driving, formation, and sensor extension. Because the LTE sidelink supports only broadcast communication, the LTE sidelink is mainly used for basic safety communication. Other advanced V2X services with a strict Quality of Service (QoS) requirement in terms of delay, reliability, and the like are supported by a New Radio (NR) sidelink.

In the NR sidelink, one or more sidelink resources may be reserved during one sidelink transmission for retransmitting data or transmitting new data. However, there is no final conclusion about how to determine, through a terminal in a sidelink transmission, sidelink resources for sending or receiving data, so as to implement sending and receiving of data on a sidelink.

SUMMARY

According to a first aspect, an embodiment of the present disclosure provides a method for determining a sidelink resource, where the method is applied to a terminal and includes:
   determining, according to at least one of a frequency domain resource of Sidelink Control Information (SCI) and frequency domain resource indication information carried by the SCI, a frequency domain resource of a target resource indicated by the SCI; and
   determining, according to at least one of a time domain resource of the SCI and time domain resource indication information carried by the SCI, a time domain resource of a target resource indicated by the SCI.

According to a second aspect, an embodiment of the present disclosure provides a terminal, including:
   a first determining module, configured to determine, according to at least one of a frequency domain resource of SCI and frequency domain resource indication information carried by the SCI, a frequency domain resource of a target resource indicated by the SCI; and
   a second determining module, configured to determine, according to at least one of a time domain resource of the SCI and time domain resource indication information carried by the SCI, a time domain resource of a target resource indicated by the SCI.

According to a third aspect, an embodiment of the present disclosure provides a terminal, including a processor, a memory, and a computer program that is stored in the memory and that can be run on the processor, where when the computer program is executed by the processor, the steps of the foregoing method for determining a sidelink resource are implemented.

According to a fourth aspect, an embodiment of the present disclosure provides a computer-readable storage medium, where the computer-readable storage medium stores a computer program, and when the computer program is executed by a processor, the steps of the foregoing method for determining a sidelink resource are implemented.

BRIEF DESCRIPTION OF DRAWINGS

With reference to detailed descriptions in preferable implementations in the following descriptions, various other advantages and benefits become clear to a person of ordinary skills in the art. The accompanying drawings are merely used to show the preferred implementations, and are not considered as limitations to the present disclosure. In addition, in all the accompanying drawings, a same reference symbol is used to represent a same part. In the accompanying drawings.

DESCRIPTION OF EMBODIMENTS

The term "include" and any other variants in the specification and claims of the present disclosure mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the description and the claims means at least one of the connected objects. For example, A and/or B represents the following three cases: Only A exists, only B exists, and both A and B exist.

In the embodiments of the present disclosure, the term such as "exemplary" or "for example" is used to represent an example, an instance, or a description. Any embodiment or design solution described as "exemplary" or "for example" in the embodiments of the present disclosure should not be construed as being more preferred or advantageous than other embodiments or design solutions. To be precise, the use of the term such as "exemplary" or "for example" is intended to present a related concept in a specific manner.

Embodiments of the present disclosure will be described below with reference to the accompanying drawings. A method for determining a sidelink resource and a terminal according to the embodiments of the present disclosure may be applied to a wireless communications system. The wireless communications system may be a 5G system, an Evolved Long Term Evolution (eLTE) system, or a subsequent evolved communications system.

Figures 1, 2:
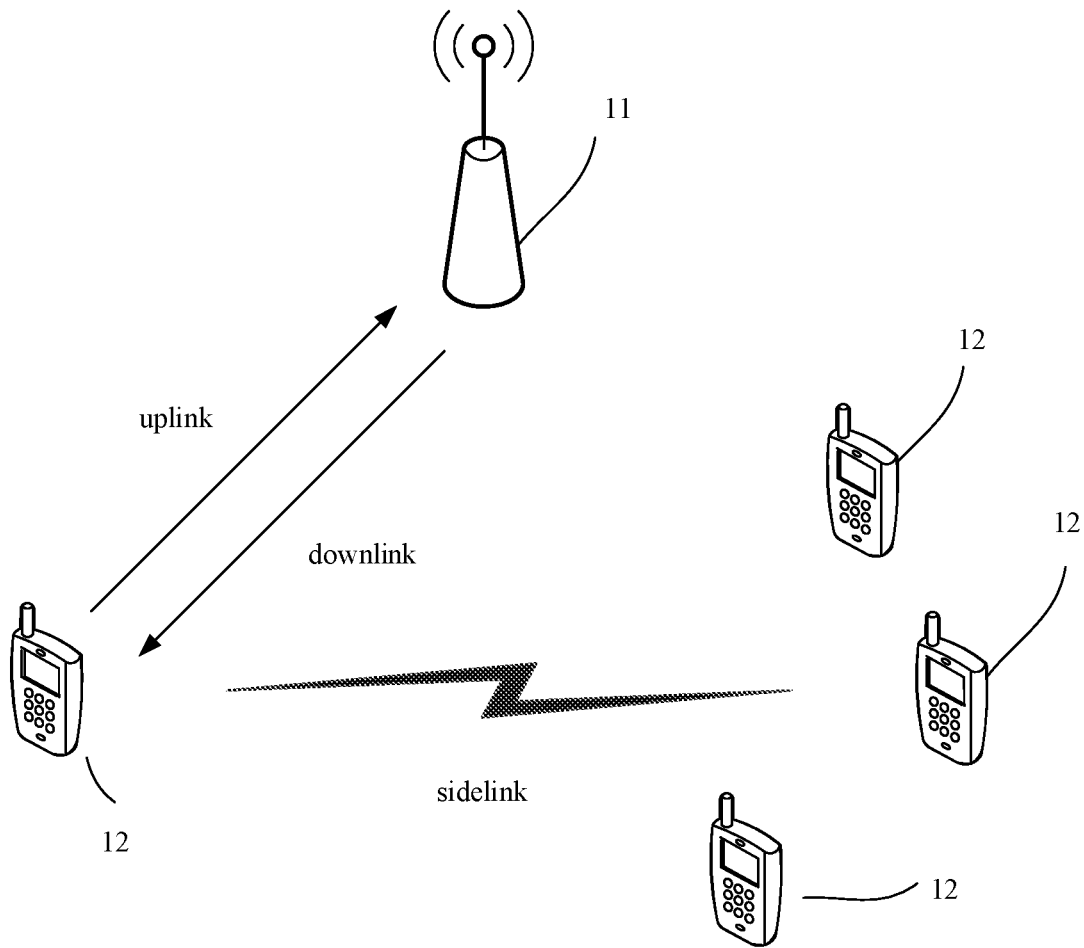
FIG. 1 is a schematic architectural diagram of a wireless communications system according to an embodiment of the present disclosure.
FIG. 2 is a schematic flow chart of a method for determining a sidelink resource according to an embodiment of the present disclosure.

Referring to FIG. 1, it is a schematic architectural diagram of a wireless communications system according to an embodiment of the present disclosure. As shown in FIG. 1, the wireless communications system may include a network side device 11 and a plurality of terminals 12. The terminals 12 may be connected to the network side device 11 through an uplink and a downlink, and the terminals 12 may be connected through a sidelink. In actual application, each of the foregoing devices may be wirelessly connected to each other.

In this embodiment of the present disclosure, a method for determining a sidelink resource between the terminals 12 is mainly described.

A terminal 12 provided in this embodiment of the present disclosure may be a mobile phone, a tablet computer, a notebook computer, an Ultra-Mobile Personal Computer (UMPC), a netbook, a Personal Digital Assistant (PDA), or the like. A person skilled in the art may understand that the terms used constitute no limitation.

Referring to FIG. 2, FIG. 2 is a schematic flow chart of a method for determining a sidelink resource according to an embodiment of the present disclosure. The method is applied to a terminal and includes the following steps.

Step 21: Determine, according to at least one of a frequency domain resource of SCI and frequency domain resource indication information carried by the SCI, a frequency domain resource of a target resource indicated by the SCI.

Step 22: Determine, according to at least one of a time domain resource of the SCI and time domain resource indication information carried by the SCI, a time domain resource of a target resource indicated by the SCI.

It should be noted that, in this embodiment of the present disclosure, an order for performing step 21 and step 22 is not limited, specifically, either step 21 or step 22 may be performed first.

In a sidelink, the terminal sends SCI through a Physical Sidelink Control Channel (PSCCH), and schedules transmission of a Physical Sidelink Shared Channel (PSSCH) to send data.

In some embodiments of the present disclosure, the SCI may include first-stage SCI. The first-stage SCI is SCI transmitted in the PSCCH. In some embodiments of the present disclosure, the SCI may include the first-stage SCI and second-stage SCI. The second-stage SCI is SCI transmitted in the PSSCH indicated by the first-stage SCI.

In this embodiment of the present disclosure, the target resource indicated by the SCI may include a resource of a currently transmitted PSSCH indicated by the SCI, and/or a reserved resource indicated by the SCI. In this embodiment of the present disclosure, the resource of the currently transmitted PSSCH indicated by the SCI represents a resource of the PSSCH "scheduled or allocated" for the SCI, or represents a resource for Transmission Block (TB) transmission and second-stage SCI transmission indicated in the SCI (the first-stage SCI and/or the second-stage SCI). The "reserved resource" indicated by the SCI includes "resources for transmitting the PSCCH and the PSSCH", which are used for next transmission, which may be used for initial transmission of a next TB or retransmission of a currently transmitted TB. The reserved resource may be located before or after the resource of the currently transmitted PSSCH.

In this embodiment of the present disclosure, the method for determining a time-frequency resource of a target resource indicated by the SCI is clarified. A transmit end of the SCI can transmit data on a determined time-frequency resource according to the foregoing determination method, and a receive end of the SCI can receive data on a determined time-frequency resource according to the foregoing determination method, so as to implement data transmission and receiving on a sidelink.

The terminal in this embodiment of the present disclosure may be the transmit end or the receive end of the SCI.

In some embodiments of the present disclosure, the time frequency resource of the target resource indicated by the SCI is determined in the following manners.

Manner 1: Determine, according to the frequency domain resource of the SCI, the frequency domain resource of the target resource indicated by the SCI, and determine, according to the time domain resource of the SCI, the time domain resource of the target resource indicated by the SCI.

In some embodiments of the present disclosure, the time frequency resource of the target resource indicated by the SCI is determined in the following manners.

Manner 2

Determine, according to the frequency domain resource indication information carried by the SCI, the frequency domain resource of the target resource indicated by the SCI, and determine, according to the time domain resource indication information carried by the SCI or the time domain resource of the SCI, the time domain resource of the target resource indicated by the SCI; or determine, according to the frequency domain resource indication information carried by the SCI or the frequency domain resource of SCI, the frequency domain resource of the target resource indicated by the SCI, and determine, according to the time domain resource indication information carried by the SCI, the time domain resource of the target resource indicated by the SCI.

Manner 1 and Manner 2 in the foregoing embodiment will be described in detail below.

1. Manner 1

1.1. Conditions for Performing Manner 1

In this embodiment of the present disclosure, if an initial transmission and retransmission indicator carried by the SCI indicates that data on the target resource is initially transmitted data, or a Hybrid Automatic Repeat reQuest (HARQ) process ID carried in the SCI is the same as a HARQ process ID carried in the SCI stored in a MAC entity, a New data indicator (NDI) indicated in the SCI is flipped, and the time frequency resource of the target resource indicated by the SCI is determined in Manner 1.

In this embodiment of the present disclosure, the stored SCI may be initially retransmitted SCI or previously retransmitted SCI, which will be stored in the MAC entity. If a piece of scheduled SCI is received in this transmission, a HARQ process ID carried by the SCI is obtained, and it is determined whether SCI corresponding to a HARQ process is found from the MAC entity. If there is the same ID, it is determined whether the NDI in currently transmitted SCI is flipped compared with the stored NDI.

In this embodiment of the present disclosure, the target resource is a resource of the currently transmitted PSSCH or reserved resource.

The HARQ process ID carried in the SCI is the same as the HARQ process ID carried in the stored SCI, and the NDI indicated in the SCI is flipped, which means that data on the target resource is initially transmitted data.

That is, if the data on the target resource is the initially transmitted data, the time frequency resource of the target resource indicated by the SCI may be determined in Manner 1.

In this embodiment of the present disclosure, the SCI includes first-stage SCI. The first-stage SCI carries the initial transmission and retransmission indicator, or carries the HARQ process ID and NDI.

1.2 Method for Determining the Frequency Domain Resource of the Target Resource Indicated by the SCI in Manner 1

In this embodiment of the present disclosure, the determining, according to the frequency domain resource of the SCI, the frequency domain resource of the target resource indicated by the SCI includes: determining the frequency domain resource of the target resource according to the frequency domain resource of the SCI, information about a frequency domain position relationship between the frequency domain resource of the target resource and the frequency domain resource of the SCI, and a size of the frequency domain resource of the target resource.

In this embodiment of the present disclosure, the target resource may be the resource of the currently transmitted PSSCH indicated by the SCI or the reserved resource indicated by the SCI.

In this embodiment of the present disclosure, a position of the frequency domain resource of the target resource may be determined according to a position of the frequency domain resource of the SCI and the information about the frequency domain position relationship between the frequency domain resource of the target resource and the frequency domain resource of the SCI.

The position of the frequency domain resource of the SCI may be a start position, an end position, or a frequency domain center position of the frequency domain resource of the SCI. Similarly, the position of the frequency domain resource of the target resource may be a start position, an end position, or a frequency domain center position of the frequency domain resource of the target resource.

In this embodiment of the present disclosure, the information about frequency domain position relationship is predefined or pre-configured.

The information about frequency domain position relationship may include one of the following:

frequency domain positions of the frequency domain of the target resource and of the frequency domain resource of the SCI are the same; and a frequency domain offset value between the frequency domain resource of the target resource and the frequency domain resource of the SCI.

The positions may include a start position, an end position, or a frequency domain center position.

In this embodiment of the present disclosure, the size of the frequency domain resource of the target resource is a predefined or pre-configured value, or is determined according to information about a relationship between the size of the frequency domain resource of the target resource and a size of the frequency domain resource of the SCI. The information about a relationship between the size of the frequency domain resource of the target resource and the size of the frequency domain resource of the SCI is predefined or pre-configured.

In some embodiments, the size of the frequency domain resource of the target resource may be determined according to the size of the frequency domain resource of the SCI and the information about a relationship between the size of the frequency domain resource of the target resource and the size of the frequency domain resource of the SCI.

In this embodiment of the present disclosure, the information about a relationship between the size of the frequency domain resource of the target resource and the size of the frequency domain resource of the SCI includes one of the following:

the size of the frequency domain resource of the target resource is equal to the size of the frequency domain resource of the SCI;

the size of the frequency domain resource of the target resource and the size of the frequency domain resource of the SCI are in a scaling relationship according to a specified scaling factor; and a specified size difference is set between the size of the frequency domain resource of the target resource and the size of the frequency domain resource of the SCI.

In this embodiment of the present disclosure, the frequency domain resource indication information for indicating the frequency domain resource of the target resource is not required to be set for the SCI, and the frequency domain resource of the target resource may be implicitly determined by the position of the frequency domain resource of the SCI, thereby reducing the overhead for the SCI.

1.3. Method for Determining the Time Domain Resource of the Target Resource Indicated by the SCI in Manner 1

In this embodiment of the present disclosure, the determining, according to the time domain resource of the SCI, the time domain resource of the target resource indicated by the SCI includes: determining the time domain resource of the target resource according to the time domain resource of the SCI and information about a relationship between the time domain resource of the target resource and the time domain resource of the SCI.

The information about a relationship between the time domain resource of the target resource and the time domain resource of the SCI is predefined or pre-configured and includes one of the following:
 the time domain resource of the target resource and the time domain resource of the SCI are located in the same time slot;
 the time domain resource of the target resource occupies a plurality of time slots, and the time domain resource of the SCI is located in at least one of the plurality of time slots;
 the time domain resource of the SCI is located in a pattern of the time domain resource of the target resource; or
 a time domain offset between a time domain position of the target resource and a time domain position of the time domain resource of the SCI.

In this embodiment of the present disclosure, the time domain resource indication information for indicating the time domain resource of the target resource is not required to be set for the SCI, and a time-frequency domain resource of the target resource may be implicitly determined by the time domain resource of the SCI, thereby reducing the overhead for the SCI.

In the method in Manner 1 of the present disclosure, by predefining and pre-configuring of information about the frequency domain resource and time-frequency domain resource, time-frequency domain resource indication information is not required to be set for the SCI, and the time-frequency domain resource of the target resource is implicitly determined by a time-frequency domain resource of the SCI, thereby reducing the overhead for the SCI.

2. Manner 2
2.1. Conditions for Performing Manner 2

In this embodiment of the present disclosure, if an initial transmission and retransmission indicator carried by the SCI indicates that data on the target resource is retransmitted data, or a HARQ process ID carried in the SCI is the same as a HARQ process ID carried in the stored SCI, a NDI carried in the SCI is not flipped, and the time frequency resource of the target resource indicated by the SCI is determined in Manner 2. The target resource includes a resource of the currently transmitted PSSCH and the reserved resource.

In this embodiment of the present disclosure, after the determining, according to the frequency domain resource indication information carried by the SCI, the frequency domain resource of the target resource indicated by the SCI, the method further includes: if transmitted data of a currently transmitted PSCCH is retransmitted data, determining a Transport Block Size (TBS) of the retransmitted data according to a Modulation and Coding Scheme (MCS) carried by the SCI and the size of the frequency domain resource of initially transmitted data.

In this embodiment of the present disclosure, the MCS carried by the SCI is the same as a MCS of the initially transmitted data. That is, the MCS of the retransmitted data is the same as the MCS of the initially transmitted data.

In this embodiment of the present disclosure, the size of the frequency domain resource of the initially transmitted data is determined in the following manners: obtaining the size of the frequency domain resource of the initially transmitted data according to the size of the frequency domain resource of the currently transmitted PSSCH carried by the SCI, a relationship between the frequency domain resource of the currently transmitted PSSCH and the reserved resource, and a retransmission times indicator or a transmission times indicator carried by the SCI.

In this embodiment of the present disclosure, when the SCI of the scheduled initially transmitted data is missed, the TBS of the retransmitted data needs to be determined according to the foregoing method. In this case, the retransmitted data may be sent at a smaller bit rate. Coding methods are all the same. Compared with initial transmission, the number of target resources is doubled, but an actual transmission coding rate is changed. In retransmission, the actual transmission coding rate is not equal to a coding rate indicated in the MCS. In case that signal overhead for a resource indicator is saved, retransmission can be implemented according to a relationship of sizes of the target resource.

2.2 Method for Determining the Frequency Domain Resource of the Target Resource Indicated by the SCI in Manner 2

2.2.1 Determine, According to the Frequency Domain Resource Indication Information Carried by the SCI, the Frequency Domain Resource of the Target Resource Indicated by the SCI.

In this embodiment of the present disclosure, the target resource indicated by the SCI includes the resource the currently transmitted PSSCH indicated by the SCI and the reserved resource, and the reserved resource is used for transmission of at least one of the PSCCH and the PSSCH.

In some embodiments of the present disclosure, the frequency domain resource indication information includes at least one of the following:
 a start position of a frequency domain resource of the currently transmitted PSSCH;
 an end position of a frequency domain resource of the currently transmitted PSSCH;
 a frequency domain center position of a frequency domain resource of the currently transmitted PSSCH;
 a size of a frequency domain resource of the currently transmitted PSSCH;
 a start position of a frequency domain resource of the reserved resource;
 an end position of a frequency domain resource of the reserved resource;
 a frequency domain center position of the reserved resource;
 a size of a frequency domain resource of the reserved resource;
 a specified scaling factor of a size of the frequency domain resource of the target resource;
 a specified size difference between sizes of the frequency domain resource of the target resource;
 a specified scaling factor of a size of a frequency domain resource of the reserved resource; or
 a specified size difference between sizes of a frequency domain resource of the reserved resource.

In some embodiments of the present disclosure, the size of reserved resource may be obtained according to the following information:
 a size of the currently transmitted PSSCH;
 a time domain position of the reserved resource or a resource position indicated in the SCI; and
 a scaling factor or a size difference.

2.2.2 Determine, According to the Frequency Domain Resource of the SCI, a Specific Method for Determining the Frequency Domain Resource of the Target Resource Indicated by the SCI.

For details, please refer to the method for determining the frequency domain resource of the target resource indicated by the SCI in Manner 1.

2.2.3 Determine, According to the Frequency Domain Resource Indication Information Carried by the SCI and the Frequency Domain Resource of the SCI, the Frequency Domain Resource of the Target Resource Indicated by the SCI.

It is determined that information about the frequency domain resource of the target resource may be partially carried by the SCI, partially defined or pre-configured.

In some embodiments of the present disclosure, the frequency domain resource of the target resource indicated by the SCI is determined according to the frequency domain resource indication information carried by the SCI and at least one of the frequency domain resource of the SCI and information about a relationship between sizes of the frequency domain resource of the target resource.

The information about a relationship between sizes of the frequency domain resource of the target resource is predefined or pre-configured, and includes at least one of the following:
  sizes of the frequency domain resource of the target resource are scaled proportionally in time sequence;
  sizes of the frequency domain resource of the target resource are set with an equal size difference in time sequence;
  sizes of the frequency domain resource of the target resource are the same; or
  sizes of the frequency domain resource of the reserved resource are the same.

2.3. A Structure of the Frequency Domain Resource Indication Information in Manner 2

2.3.1. The Frequency Domain Resource Indication Information Includes Two Indicator Fields.

In some embodiments of the present disclosure, the target resource indicated by the SCI includes the resource the currently transmitted PSSCH indicated by the SCI and the reserved resource, and the reserved resource is used for transmission of at least one of the PSCCH and the PSSCH.

The frequency domain resource indication information includes first frequency domain resource indication information for indicating the resource of the currently transmitted PSSCH, and/or second frequency domain resource indication information for indicating the reserved resource. The first frequency domain resource indication information is in one of the indicator fields, and the second frequency domain resource indication information is in the other of the indicator fields.

The number of pieces of the first frequency domain resource indication information is 1, and the number of pieces of the second frequency domain resource indication information is N−1, where N is the number of pieces of frequency domain resource indication information carried in the SCI, and N is a positive integer greater than or equal to 2.

The number of the reserved resources is K−1, where K is the number of the target resources indicated by the SCI, and K is a positive integer greater than or equal to 2.

The N−1 pieces of the second frequency domain resource indication information and the K−1 pieces of the reserved resources have a one-to-one or many-to-one relationship.

In this embodiment of the present disclosure, the SCI includes first-stage SCI and second-stage SCI.

The first frequency domain resource indication information is carried in the second-stage SCI, and the second frequency domain resource indication information is carried in the first-stage SCI; or
  the first frequency domain resource indication information and the second frequency domain resource indication information are both carried in the second-stage SCI; or
  the first frequency domain resource indication information and the second frequency domain resource indication information are both carried in the first-stage SCI.

If the first frequency domain resource indication information and the second frequency domain resource indication information are both carried in the second-stage SCI, the entire frequency domain is used as a unit for resource elimination during sensing, and a reserved specific frequency domain position is not considered. For example, average energy measured in a single time slot is considered.

In this embodiment of the present disclosure, the first frequency domain resource indication information is the $n^{th}$ piece of the frequency domain resource indication information carried by the SCI, which indicates an order for transmitting the currently transmitted PSSCH in the indicated target resource. The value of n is indicated by the SCI, or configured, pre-configured, or predefined.

2.3.2. The Frequency Domain Resource Indication Information Includes One Indicator Field.

In this embodiment of the present disclosure, the target resource indicated by the SCI includes the resource of the currently transmitted PSSCH indicated by the SCI and the reserved resource, and the reserved resource is used for transmission of at least one of the PSCCH and the PSSCH.

One piece of the frequency domain resource indication information, is used to indicate the resource of the currently transmitted PSSCH and the reserved resource.

In this embodiment of the present disclosure, the SCI includes the first-stage SCI and the second-stage SCI, and the frequency domain resource indication information is carried in the first-stage SCI.

2.4 Method for Determining the Time Domain Resource of the Target Resource Indicated by the SCI in Manner 2

In this embodiment of the present disclosure, in Manner 2, the time domain resource of the target resource indicated by the SCI may be determined in two ways, which are explained separately below.

2.4.1 Determine, According to the Time Domain Resource of the SCI, the Time Domain Resource of the Target Resource Indicated by the SCI.

In this embodiment of the present disclosure, the time domain resource of the target resource is determined according to the time domain resource of the SCI and information about a relationship between the time domain resource of the target resource and the time domain resource of the SCI.

The information about a relationship between the time domain resource of the target resource and the time domain resource of the SCI is predefined or pre-configured and includes one of the following:
  the time domain resource of the target resource and the time domain resource of the SCI are located in the same time slot;
  the time domain resource of the target resource occupies a plurality of time slots, and the time domain resource of the SCI is located in at least one of the plurality of time slots;
  the time domain resource of the SCI is located in a pattern of the time domain resource of the target resource; or
  a time domain offset between a time domain position of the target resource and a time domain position of the time domain resource of the SCI.

2.4.2 Determine, According to the Time Domain Resource Indication Information Carried by the SCI, the Time Domain Resource of the Target Resource Indicated by the SCI.

In this embodiment of the present disclosure, the target resource indicated by the SCI includes the resource of the currently transmitted PSSCH indicated by the SCI and the reserved resource. The reserved resource is used for transmission of at least one of the PSCCH and the PSSCH.

The time domain resource indication information includes at least one of the following:
- a time domain interval between a time domain resource of the reserved resource and the time domain resource of the resource of the currently transmitted PSSCH;
- a time domain interval between a time domain resource of the reserved resource and the time domain resource of the SCI;
- a time domain interval between two of the target resources;
- a time domain interval between two of the reserved resources;
- a reserved period of a time domain resource of the resource of the currently transmitted PSSCH; or
- a reserved period of the time domain resource of the target resource.

In this embodiment of the present disclosure, if the time domain resource indication information indicates the time domain interval between the two of the target resources, the target resources include the resource of the currently transmitted PSSCH indicated by the SCI. If the time domain resource indication information indicates the time domain interval between the two of the reserved resources, the resource of the currently transmitted PSSCH indicated by the SCI is not included.

The reserved period is similar to the initial transmission and retransmission indicator in LTEV2X. In LTE, 0 means initial transmission and 1 means retransmission. When 0 is indicated, a next resource will be reserved continuously. When 1 is indicated, the next resource will not be reserved for the SCI. In addition, if a plurality of resources is reserved periodically, no matter which SCI is missed, K resources can be reserved periodically as long as one piece of SCI is obtained, which enhances reliability.

2.4.3 DETERMINE, ACCORDING TO THE TIME DOMAIN RESOURCE INDICATION INFORMATION Carried by the SCI and the Time Domain Resource of the SCI, the Time Domain Resource of the Target Resource Indicated by the SCI.

For the time domain resource indication information, please refer to the frequency domain resource indication information in 2.4.2.

In the foregoing embodiments, the time domain interval or time domain resource size is an integer, and its unit may be a symbol, a time slot, a plurality of time slots, or a pattern. The frequency domain interval or the frequency domain resource size is an integer, and its unit is a resource block or a sub-channel.

In the method of Manner 2 of the present disclosure, the SCI carries the frequency domain resource indication information, which can improve indication flexibility.

Next, the method for determining a sidelink resource according to the present disclosure will be illustrated with reference to specific embodiments.

Implementation 1 of the Present Disclosure

Predefined: a sidelink transmission indicates K=4 resources, and the target resources indicated by the SCI include one resource of the currently transmitted PSSCH and three reserved resources. The first-stage SCI carries N=1 piece of frequency domain resource indication information, and the frequency domain resource indication information includes a size of the frequency domain resource of the resource of the currently transmitted PSSCH, that is, n1. The SCI carries M=3 time domain interval indicators.

According to the frequency domain resource indication information carried by the SCI, the size of the frequency domain resource of the resource of the currently transmitted PSSCH is obtained through the terminal. It is assumed that sizes of the frequency domain resource in the predefined K=4 transmissions are the same, that is, the size of the frequency domain resource of the reserved resource indicated by the SCI is equal to the size of frequency domain resource of the resource of the currently transmitted PSSCH.

According to the start position of the frequency domain resource of the SCI, the start position of the frequency domain resource of the resource of the currently transmitted PSSCH is obtained through the terminal.

Figure 3:
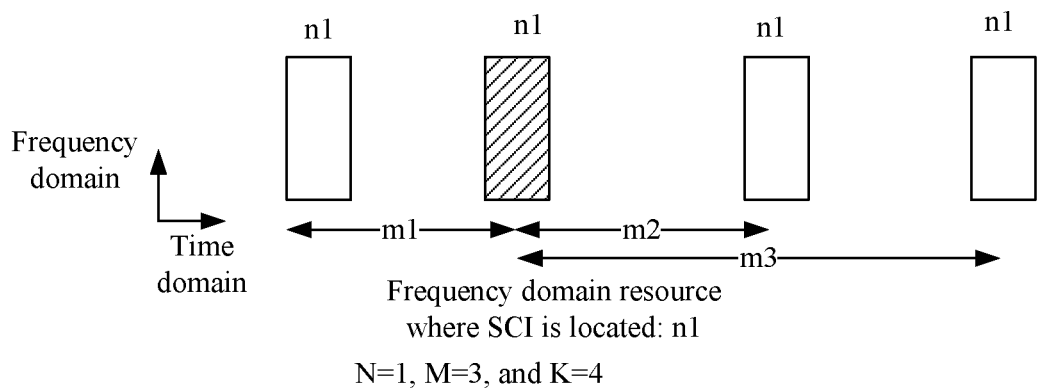
FIG. 3 and FIG. 4 are examples of the method for determining a sidelink resource according to a first embodiment of the present disclosure.
Figure 4:
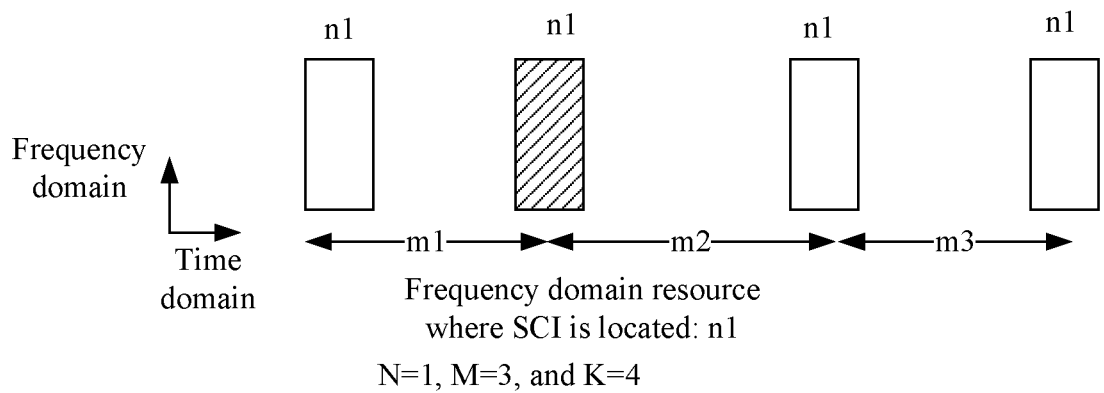

The time domain resource of the currently transmitted PSSCH is obtained through the terminal according to a time slot where the SCI is located, and it is assumed that the predefined currently transmitted PSSCH and SCI are in the same time slot. According to the M=3 time domain interval indicators, an interval between the reserved resource and the currently transmitted PSSCH (refer to FIG. 3) is obtained. Alternatively, according to the M=3 time domain interval indicators, an interval between two adjacent reserved resources (refer to FIG. 4) is obtained, so as to determine a time domain resource of the reserved resource. Three time-domain intervals (m1, m2, m3) are respectively indicated in order of three time domain resource indication domain values in the SCI.

Implementation 2 of the Present Disclosure

Predefined: a sidelink transmission indicates K=4 resources, and the target resources indicated by the SCI include one resource of the currently transmitted PSSCH and three reserved resources. The first-stage SCI carries N=1 pieces of frequency domain resource indication information, and the frequency domain resource indication information indicates the size of the frequency domain resource of the reserved resource, that is n1. The first-stage SCI carries M=3 time domain interval indicators.

A frequency domain resource of a first target resource (the resource of the currently transmitted PSSCH) indicated by pre-configured SCI is one sub-channel.

The size of the frequency domain resource of the reserved resource is obtained through the terminal according to the frequency domain resource indication information in the SCI. The size of the frequency domain resource of the three reserved resources are all obtained according to the frequency domain resource indication information indicated in the SCI, and the three reserved resources are predefined or pre-configured to have the same size. According to a frequency domain start position of the SCI, a start position of the frequency domain resource of the resource of the currently transmitted PSSCH is obtained.

The time domain resource of the currently transmitted PSSCH is obtained through the terminal according to a time slot where the SCI is located, and it is assumed that the predefined currently transmitted PSSCH and SCI are in the same time slot. According to the M=3 time domain interval indicators, an interval between the reserved resource and the currently transmitted PSSCH (refer to FIG. 5) is obtained. Alternatively, according to the M=3 time domain interval indicators, an interval between two adjacent reserved resources (refer to FIG. 6) is obtained, so as to determine a time domain resource of the reserved resource. Three time-domain intervals (m1, m2, m3) are respectively indicated in order of three time domain resource indication domain values in the SCI.

Figure 5:
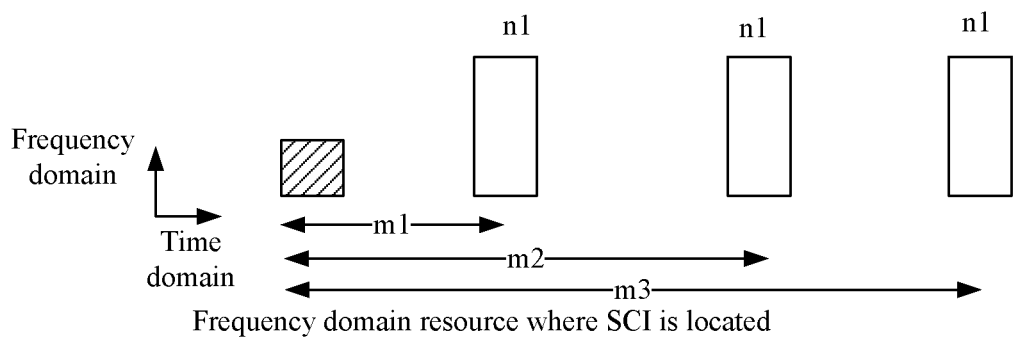
FIG. 5 and FIG. 6 are examples of the method for determining a sidelink resource according to a second embodiment of the present disclosure.
Figure 6:
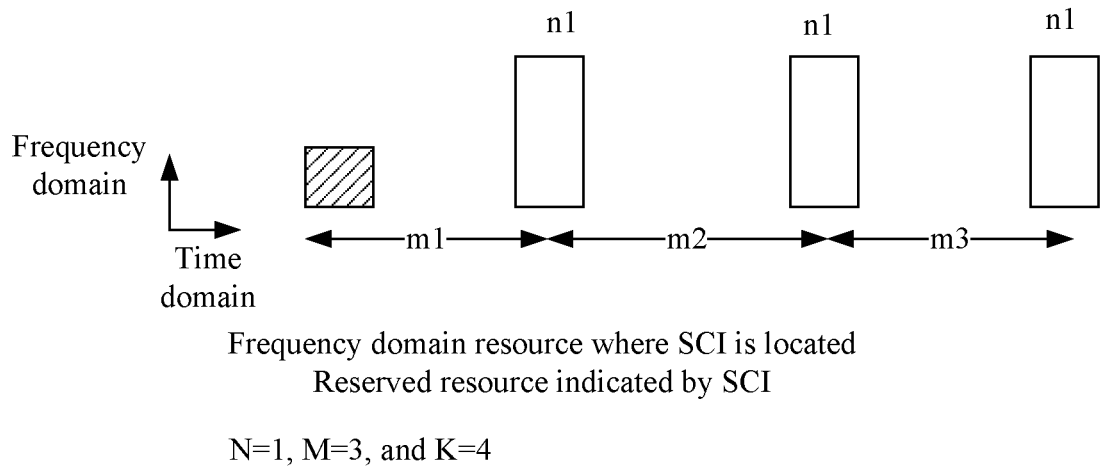

In the embodiments shown in FIG. 5 and FIG. 6, a small resource is scheduled and initially transmitted for the first time, indicating that subsequent resource reservation can be used for retransmission for more resources.

Implementation 3 of the Present Disclosure

Predefined: a sidelink transmission indicates K=4 resources, and the target resources indicated by the SCI include one resource of the currently transmitted PSSCH and three reserved resources. Second-stage SCI carries N=1 pieces of frequency domain resource indication information, which indicates a size of a frequency domain resource of the resource of the currently transmitted PSSCH, that is, n1. The first-stage SCI carries N−1=3 frequency domain resource indicators, which is used to indicate the sizes of the frequency domain resource of the reserved resource, namely n2, n3, and n4. The first-stage SCI carries M=3 time domain interval indicators.

The frequency domain resource of the reserved resource is determined through the terminal according to the frequency domain resource indication information carried by the first-stage SCI, and the frequency domain resource of the resource of the currently transmitted PSSCH is determined according to the frequency domain resource indication information carried by the second-stage SCI.

Figure 7:
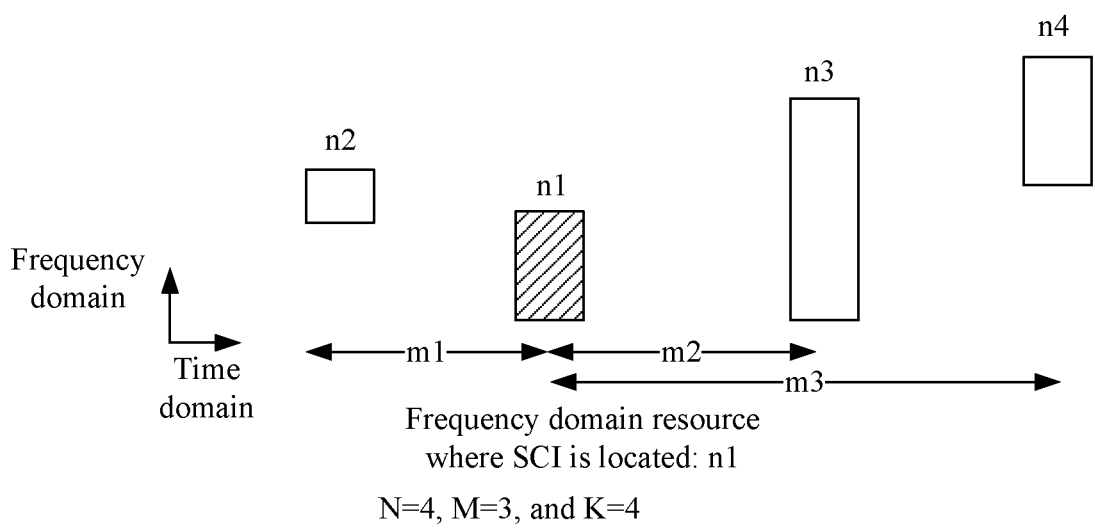
FIG. 7 is an example of the method for determining a sidelink resource according to a third embodiment of the present disclosure.

The time domain resource of the currently transmitted PSSCH is obtained through the terminal according to a time slot where the SCI is located, and it is assumed that the predefined currently transmitted PSSCH and SCI are in the same time slot. According to the M=3 time domain interval indicators, an interval between the reserved resource and the currently transmitted PSSCH (refer to FIG. 7) is obtained.

Implementation 4 of the Present Disclosure

Predefined: a sidelink transmission indicates K=4 resources, and the target resources indicated by the SCI include one resource of the currently transmitted PSSCH and three reserved resources. The SCI carries N=1 piece of frequency domain resource indication information, which indicates a size of the frequency domain resource of the resource of the currently transmitted PSSCH, that is, n1. The SCI carries M=3 time domain interval indicators. The SCI carries an indicator of B=1 scaling factor or size difference of the frequency domain resource.

Figure 8:
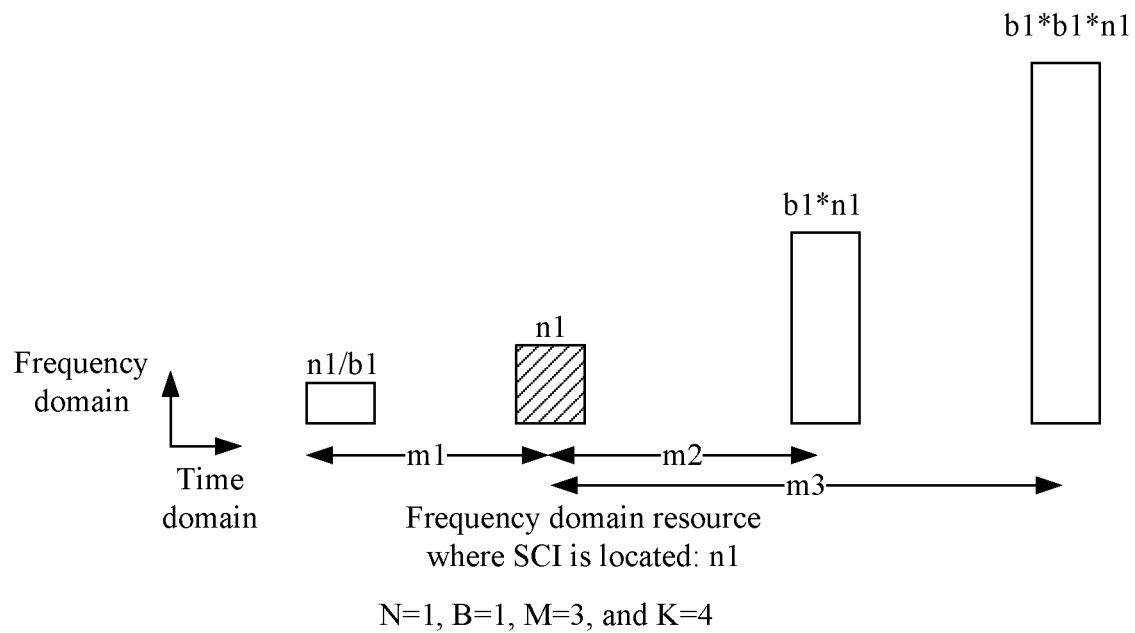
FIG. 8 and FIG. 9 are examples of the method for determining a sidelink resource according to a fourth embodiment of the present disclosure.
Figure 9:
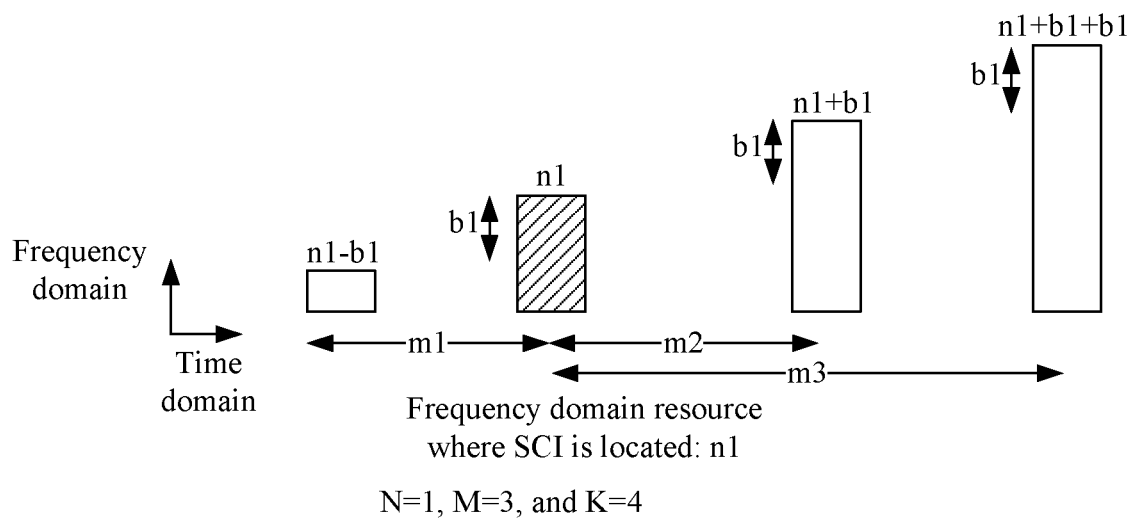

A size of the frequency domain resource of the resource of the currently transmitted PSSCH is obtained through a terminal according to frequency domain resource indication information carried by the SCI. According to a start position of a frequency domain resource of the SCI, a frequency domain start position of the currently transmitted PSSCH is obtained. According to the indicator of the scaling factor or size difference of the frequency domain resource, a specified scaling factor (FIG. 8) or size difference (FIG. 9) of two adjacent reserved resources is obtained.

The time domain resource of the currently transmitted PSSCH is obtained through the terminal according to a time slot where the SCI is located, and it is assumed that the predefined currently transmitted PSSCH and SCI are in the same time slot. According to the M=3 time domain interval indicators, an interval between a reserved resource and a currently transmitted PSSCH (refer to FIG. 8 and FIG. 9) is obtained.

In this embodiment of the present disclosure, frequency domain resource indication information, a time domain interval indicator, or the indicator of the scaling factor or size difference of the frequency domain resource may all be carried in first-stage SCI.

Implementation 5 of the Present Disclosure

Predefined: a sidelink transmission indicates K=4 resources, and the target resources indicated by the SCI include one resource of the currently transmitted PSSCH and three reserved resources. The SCI carries N=1 piece of frequency domain resource indication information, which indicates a size of the frequency domain resource of the resource of the currently transmitted PSSCH, that is, n1. The SCI carries M=3 time domain interval indicators. The SCI carries an indicator of B=3 scaling factor or size difference of the frequency domain resource.

A size of the frequency domain resource of the resource of the currently transmitted PSSCH is obtained through a terminal according to frequency domain resource indication information carried by the SCI. According to a start position of a frequency domain resource of the SCI, a frequency domain start position of the currently transmitted PSSCH is obtained. According to the indicator of the scaling factor or size difference of the frequency domain resource, a specified size difference between the reserved resource and a frequency domain resource of the currently transmitted PSSCH is obtained.

Figure 10:
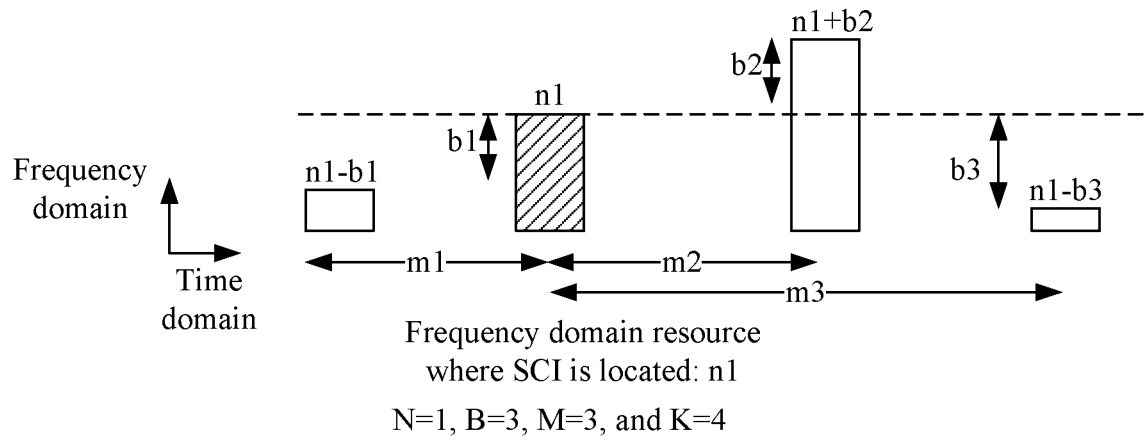
FIG. 10 is an example of the method for determining a sidelink resource according to a fifth embodiment of the present disclosure.

The time domain resource of the currently transmitted PSSCH is obtained through the terminal according to a time slot where the SCI is located, and it is assumed that the predefined currently transmitted PSSCH and SCI are in the same time slot. According to the M=3 time domain interval indicators, an interval between the reserved resource and the currently transmitted PSSCH (refer to FIG. 10) is obtained.

In this embodiment of the present disclosure, frequency domain resource indication information, a time domain interval indicator, or the indicator of the scaling factor or size difference of the frequency domain resource may all be carried in first-stage SCI.

Implementation 6 of the Present Disclosure

Predefined: a sidelink transmission indicates K=4 resources, and the target resources indicated by the SCI include one resource of the currently transmitted PSSCH and three reserved resources. The SCI carries a reserved period T of the target resource. The SCI carries N=1 piece of frequency domain resource indication information, which indicates a size of the frequency domain resource of the resource of the currently transmitted PSSCH, that is, n1. The SCI carries M=3 time domain interval indicators.

A size of the frequency domain resource of the resource of the currently transmitted PSSCH is obtained through a terminal according to frequency domain resource indication information carried by the SCI. It is assumed that the sizes of the frequency domain resources in the predefined K=4 transmissions are the same, that is, the size of the frequency domain resource of the reserved resource indicated by the SCI is equal to the size of frequency domain resource of the resource of the currently transmitted PSSCH. According to a start position of a frequency domain resource of the SCI, a frequency domain start position of the currently transmitted PSSCH is obtained.

Figure 11:
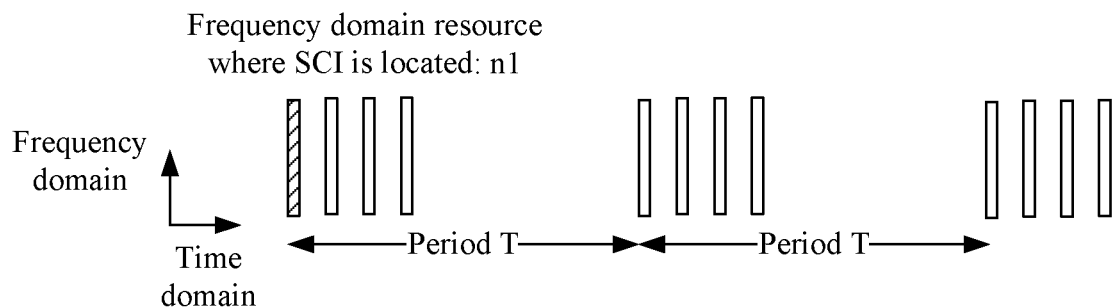
FIG. 11 is an example of the method for determining a sidelink resource according to a sixth embodiment of the present disclosure.

The time domain resource of the currently transmitted PSSCH is obtained through the terminal according to a time slot where the SCI is located, and it is assumed that the predefined currently transmitted PSSCH and SCI are in the same time slot. According to the M=3 time domain interval indicators, an interval between two adjacent target resources (refer to FIG. 11) is obtained.

The terminal periodically reserves, according to periodically reserved indication information, the time-frequency domain resource of the target resource indicated by the SCI.

In this embodiment of the present disclosure, the frequency domain resource indication information and a time domain interval indicator may be both carried in first-stage SCI.

Implementation 7 of the Present Disclosure

Predefined: a sidelink transmission indicates K=4 resources, and the target resources indicated by the SCI include one resource of the currently transmitted PSSCH and three reserved resources. The SCI carries a reserved period T of the resource of the currently transmitted PSSCH. The SCI carries N=1 piece of frequency domain resource indication information, which indicates a size of the frequency domain resource of the resource of the currently transmitted PSSCH, that is, n1. The SCI carries M=3 time domain interval indicators.

A size of the frequency domain resource of the resource of the currently transmitted PSSCH is obtained through a terminal according to frequency domain resource indication information carried by the SCI. It is assumed that the sizes of the frequency domain resources in the predefined K=4 transmissions are the same, that is, the size of the frequency domain resource of the reserved resource indicated by the SCI is equal to the size of frequency domain resource of the resource of the currently transmitted PSSCH. According to a start position of a frequency domain resource of the SCI, a frequency domain start position of the currently transmitted PSSCH is obtained.

Figure 12:
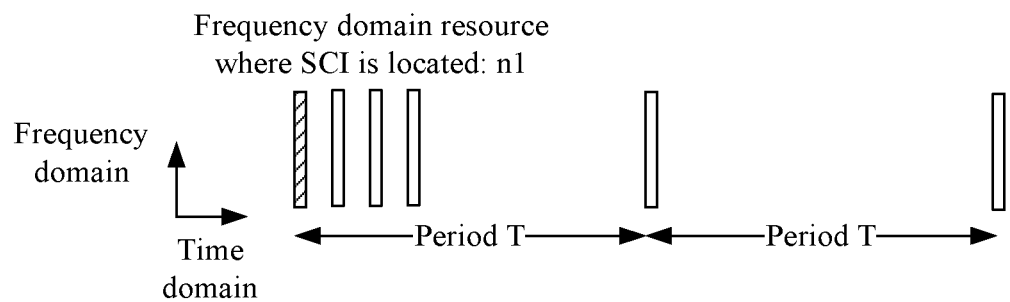
FIG. 12 is an example of the method for determining a sidelink resource according to a seventh embodiment of the present disclosure.

The time domain resource of the currently transmitted PSSCH is obtained through the terminal according to a time slot where the SCI is located, and it is assumed that the predefined currently transmitted PSSCH and SCI are in the same time slot. According to the M=3 time domain interval indicators, an interval between two adjacent target resources (refer to FIG. 12) is obtained.

The terminal periodically reserves, according to periodically reserved indication information, a time-frequency domain resource of the resource of the currently transmitted PSSCH indicated by the SCI.

In this embodiment of the present disclosure, the frequency domain resource indication information and a time domain interval indicator may be both carried in first-stage SCI.

In this embodiment of the present disclosure, it may be considered that a first resource is used for long term reservation, and a time-frequency domain resource indicator is used for short term sensing and reservation indication.

The foregoing method in this embodiment of the present disclosure may be applied to a LTE sidelink, NR Uu, or a subsequent version of a sidelink.

Figure 13:
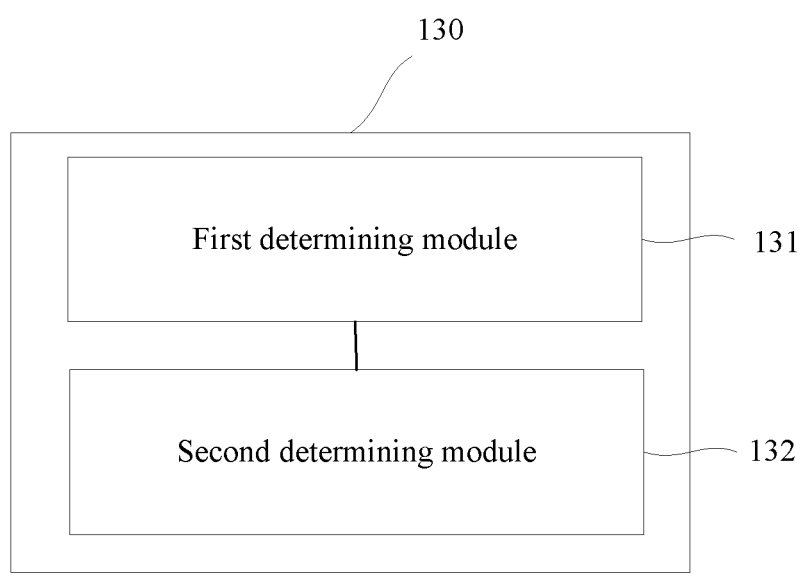
FIG. 13 is a schematic structural diagram of a terminal according to an embodiment of the present disclosure.

Referring to FIG. 13, an embodiment of the present disclosure further provides a terminal 130, including:
a first determining module 131, configured to determine, according to at least one of a frequency domain resource of SCI and frequency domain resource indication information carried by the SCI, a frequency domain resource of a target resource indicated by the SCI; and
a second determining module 132, configured to determine, according to at least one of a time domain resource of the SCI and time domain resource indication information carried by the SCI, a time domain resource of a target resource indicated by the SCI.

In this embodiment of the present disclosure, the method for determining a time-frequency resource of a target resource indicated by the SCI is clarified. A transmit end of the SCI can transmit data on a determined time-frequency resource according to the foregoing determination method, and a receive end of the SCI can receive data on a determined time-frequency resource according to the foregoing determination method, so as to implement data transmission and receiving on a sidelink.

In some embodiments, the first determining module 131 is configured to determine the frequency domain resource of the target resource according to the frequency resource of the SCI, information about a frequency domain position relationship between the frequency domain resource of the target resource and the frequency domain resource of the SCI, and a size of the frequency domain resource of the target resource.

In some embodiments, the information about a frequency domain position relationship is predefined or pre-configured.

In some embodiments, the information about a frequency domain position relationship includes one of the following:
frequency domain positions of the frequency domain of the target resource and of the frequency domain resource of the SCI are the same; and
a frequency domain offset value between the frequency domain resource of the target resource and the frequency domain resource of the SCI.

In some embodiments, the size of the frequency domain resource of the target resource is a predefined or pre-configured value, or is determined according to information about a relationship between the size of the frequency domain resource of the target resource and a size of the frequency domain resource of the SCI. The information about a relationship between the size of the frequency domain resource of the target resource and the size of the frequency domain resource of the SCI is predefined or pre-configured.

In some embodiments, the information about a relationship between the size of the frequency domain resource of the target resource and the size of the frequency domain resource of the SCI includes one of the following:
the size of the frequency domain resource of the target resource is equal to the size of the frequency domain resource of the SCI;
the size of the frequency domain resource of the target resource and the size of the frequency domain resource of the SCI are in a scaling relationship according to a specified scaling factor; and
a specified size difference is set between the size of the frequency domain resource of the target resource and the size of the frequency domain resource of the SCI.

In some embodiments, the target resource indicated by the SCI includes the resource of the currently transmitted PSSCH indicated by the SCI and the reserved resource. The reserved resource is used for transmission of at least one of the PSCCH and the PSSCH.

In some embodiments, the frequency domain resource indication information includes at least one of the following:
a start position of a frequency domain resource of the currently transmitted PSSCH;
an end position of a frequency domain resource of the currently transmitted PSSCH; a frequency domain center position of a frequency domain resource of the currently transmitted PSSCH;
a size of a frequency domain resource of the currently transmitted PSSCH;
a start position of a frequency domain resource of the reserved resource;
an end position of a frequency domain resource of the reserved resource;
a frequency domain center position of the reserved resource;
a size of a frequency domain resource of the reserved resource;
a specified scaling factor of a size of the frequency domain resource of the target resource;
a specified size difference between sizes of the frequency domain resource of the target resource;
a specified scaling factor of a size of a frequency domain resource of the reserved resource; or
a specified size difference between sizes of a frequency domain resource of the reserved resource.

In some embodiments, the first determining module 131 is configured to determine the frequency domain resource of the target resource indicated by the SCI according the frequency domain resource indication information carried by the SCI and at least one of the frequency domain resource of the SCI and information about a relationship between sizes of the frequency domain resource of the target resource.

The information about a relationship between sizes of the frequency domain resource of the target resource includes at least one of the following:
sizes of the frequency domain resource of the target resource are scaled proportionally in time sequence;
sizes of the frequency domain resource of the target resource are set with an equal size difference in time sequence;
sizes of the frequency domain resource of the target resource are the same; or
sizes of the frequency domain resource of the reserved resource are the same.

In some embodiments, the target resource indicated by the SCI includes the resource of the currently transmitted PSSCH indicated by the SCI and the reserved resource. The reserved resource is used for transmission of at least one of the PSCCH and the PSSCH.

The frequency domain resource indication information includes: first frequency domain resource indication information for indicating the resource of the currently transmitted PSSCH, and/or second frequency domain resource indication information for indicating the reserved resource.

The number of pieces of the first frequency domain resource indication information is 1, and the number of pieces of the second frequency domain resource indication information is N-1, where N is the number of pieces of frequency domain resource indication information carried in the SCI, and N is a positive integer greater than or equal to 2.

The number of the reserved resources is K-1, where K is the number of the target resources indicated by the SCI, and K is a positive integer greater than or equal to 2.

The N-1 pieces of the second frequency domain resource indication information and the K-1 pieces of the reserved resources have a one-to-one or many-to-one relationship.

In some embodiments, the SCI includes first-stage SCI and second-stage SCI.

The first frequency domain resource indication information is carried in the second-stage SCI, and the second frequency domain resource indication information is carried in the first-stage SCI; or
the first frequency domain resource indication information and the second frequency domain resource indication information are both carried in the second-stage SCI; or
the first frequency domain resource indication information and the second frequency domain resource indication information are both carried in the first-stage SCI.

In some embodiments, the first frequency domain resource indication information is the $n^{th}$ piece of frequency domain resource indication information carried by the SCI.

The value of n is indicated by the SCI, or configured, pre-configured, or predefined.

In some embodiments, the target resource indicated by the SCI includes the resource of the currently transmitted PSSCH indicated by the SCI and the reserved resource. The reserved resource is used for transmission of at least one of the PSCCH and the PSSCH.

One piece of the frequency domain resource indication information, is used to indicate the resource of the currently transmitted PSSCH and the reserved resource.

In some embodiments, the SCI includes the first-stage SCI and the second-stage SCI, and the frequency domain resource indication information is carried in the first-stage SCI.

In some embodiments, the second determining module 132 is configured to determine the time domain resource of the target resource according to the time domain resource of the SCI and information about a relationship between the time domain resource of the target resource and the time domain resource of the SCI.

The information about a relationship between the time domain resource of the target resource and the time domain resource of the SCI is predefined or pre-configured and includes one of the following:
the time domain resource of the target resource and the time domain resource of the SCI are located in the same time slot;
the time domain resource of the target resource occupies a plurality of time slots, and the time domain resource of the SCI is located in at least one of the plurality of time slots;
the time domain resource of the SCI is located in a pattern of the time domain resource of the target resource; or
a time domain offset between a time domain position of the target resource and a time domain position of the time domain resource of the SCI.

In some embodiments, the target resource indicated by the SCI includes the resource of the currently transmitted PSSCH indicated by the SCI and the reserved resource. The reserved resource is used for transmission of at least one of the PSCCH and the PSSCH.

The time domain resource indication information includes at least one of the following:
a time domain interval between a time domain resource of the reserved resource and the time domain resource of the resource of the currently transmitted PSSCH;
a time domain interval between a time domain resource of the reserved resource and the time domain resource of the SCI;
a time domain interval between two of the target resources;

a time domain interval between two of the reserved resources;
a reserved period of a time domain resource of the resource of the currently transmitted PSSCH; or
a reserved period of the time domain resource of the target resource.

In some embodiments, if an initial transmission and retransmission indicator carried by the SCI indicates that data on the target resource is initially transmitted data, or a HARQ process ID carried in the SCI is the same as a HARQ process ID carried in the stored SCI, and a NDI carried in the SCI is flipped, the first determining module 131 is configured to determine, according to the frequency domain resource of the SCI, the frequency domain resource of the target resource indicated by the SCI, and the second determining module 132 is configured to determine, according to the time domain resource of the SCI, the time domain resource of the target resource indicated by the SCI. The target resource is a resource of a currently transmitted PSSCH or a reserved resource.

In some embodiments, the SCI includes the first-stage SCI. The first-stage SCI carries the initial transmission and retransmission indicator, or carries the HARQ process ID and NDI.

In some embodiments, if the initial transmission and retransmission indicator carried by the SCI indicates that data on the target resource is retransmitted data, or a HARQ process ID carried in the SCI is the same as a HARQ process ID carried in the stored SCI, a NDI carried in the SCI is not flipped.

The first determining module 131 is configured to determine, according to the frequency domain resource indication information carried by the SCI, the frequency domain resource of the target resource indicated by the SCI, and the second determining module 132 is configured to determine, according to the time domain resource indication information carried by the SCI or the time domain resource of the SCI, the time domain resource of the target resource indicated by the SCI.

Alternatively,
the first determining module 131 is configured to determine, according to the frequency domain resource indication information carried by the SCI or the frequency domain resource of the SCI, the frequency domain resource of the target resource indicated by the SCI; and the second determining module 132 is configured to determine, according to the time domain resource indication information carried by the SCI, the time domain resource of the target resource indicated by the SCI.

The target resource includes a resource of the currently transmitted PSSCH and the reserved resource.

In some embodiments, the terminal 130 may further include:
a third determining module, configured to determine, if the data transmitted through the currently transmitted PSCCH is retransmitted data, a transport block size of the retransmitted data according to a MCS carried by the SCI and a size of the frequency domain resource of initially transmitted data.

In some embodiments, the MCS carried by the SCI is the same as a MCS of the initially transmitted data.

In some embodiments, the size of the frequency domain resource of the initially transmitted data is determined in the following ways.

The size of the frequency domain resource of the initially transmitted data is obtained according to the size of the frequency domain resource of the currently transmitted PSSCH carried by the SCI, a relationship between the frequency domain resource of the currently transmitted PSSCH and the reserved resource, and a retransmission times indicator or a transmission times indicator carried by the SCI.

A terminal according to an embodiment of the present disclosure can implement the processes performed by the terminal in the method embodiments in FIG. 1 to FIG. 12. To avoid repetition, details are not described herein again.

Figure 14:
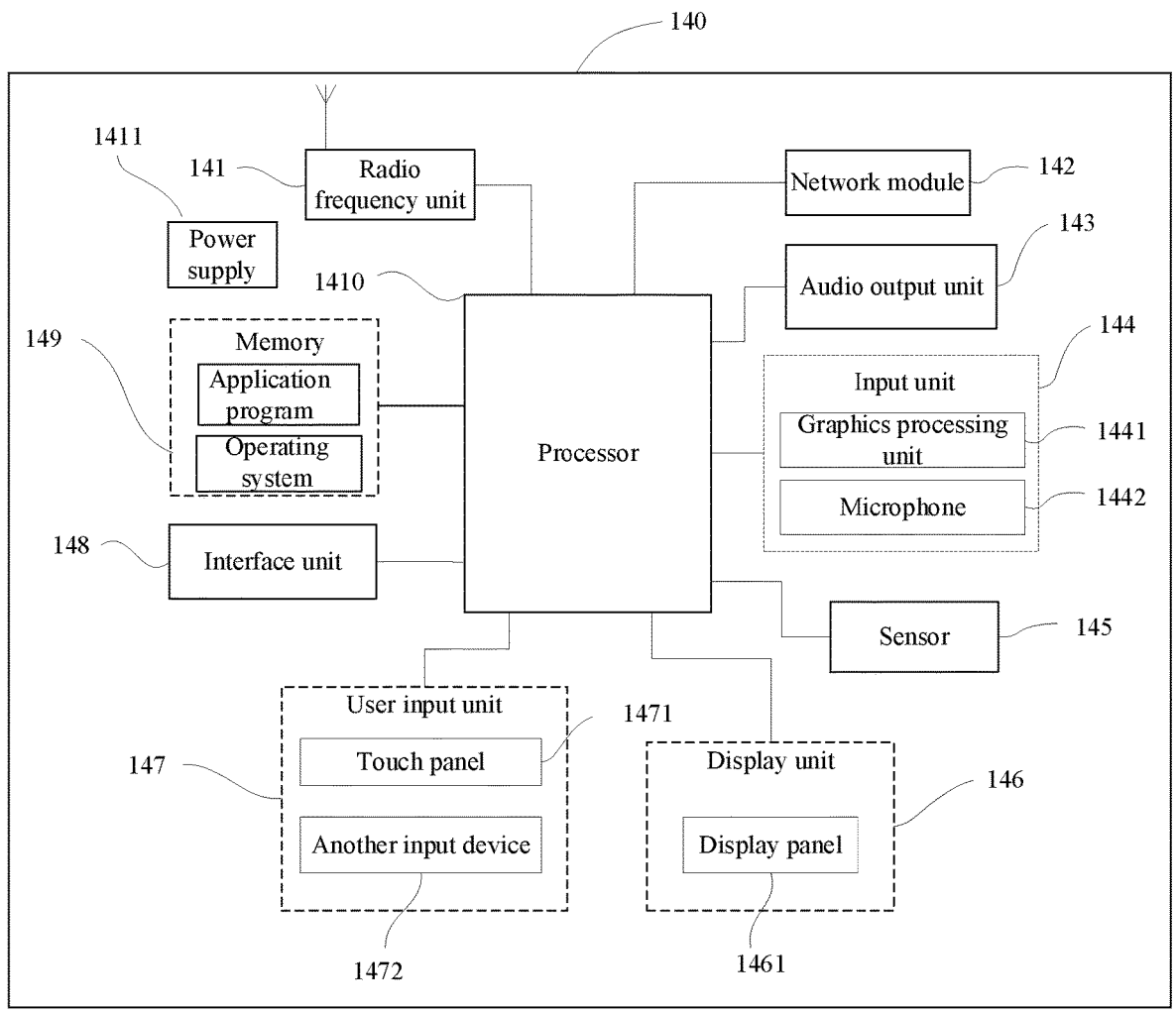
FIG. 14 is a schematic structural diagram of a terminal according to another embodiment of the present disclosure.

Referring to FIG. 14, FIG. 14 is a schematic structural diagram of a terminal according to another embodiment of the present disclosure. The terminal 140 includes but is not limited to: a radio frequency unit 141, a network module 142, an audio output unit 143, an input unit 144, a sensor 145, a display unit 146, a user input unit 147, an interface unit 148, a memory 149, a processor 1410, a power supply 1411, and other components. A person skilled in the art may understand that a structure of the terminal shown in FIG. 14 does not constitute a limitation to the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a wearable device, a pedometer, and the like.

The processor 1410 is configured to determine, according to at least one of a frequency domain resource of SCI and frequency domain resource indication information carried by the SCI, a frequency domain resource of a target resource indicated by the SCI; and determine, according to at least one of a time domain resource of the SCI and time domain resource indication information carried by the SCI, a time domain resource of the target resource indicated by the SCI.

In this embodiment of the present disclosure, the method for determining a time-frequency resource of a target resource indicated by the SCI is clarified. A transmit end of the SCI can transmit data on a determined time-frequency resource according to the foregoing determination method, and a receive end of the SCI can receive data on a determined time-frequency resource according to the foregoing determination method, so as to implement data transmission and receiving on a sidelink.

A terminal according to an embodiment of the present disclosure can implement the processes performed by the terminal in the method embodiments in FIG. 1 to FIG. 12. To avoid repetition, details are not described herein again.

It should be understood that in this embodiment of the present disclosure, the radio frequency unit 141 may be configured to receive and transmit information, or receive and transmit signals during a call. Specifically, the radio frequency unit receives downlink data from a base station, and transmits the downlink data to the processor 1410 for processing; and transmits uplink data to the base station. Generally, the radio frequency unit 141 includes but is not limited to: an antenna, at least one amplifier, a transceiver, a coupler, a low noise amplifier, a duplexer, and the like. In addition, the radio frequency unit 141 may further communicate with another communications device through a wireless communications system and network.

The terminal provides wireless broadband Internet access to a user through the network module 142, for example, helps the user receive and send e-mails, browse web pages, access streaming media, and the like.

The audio output unit 143 may convert audio data received by the radio frequency unit 141 or the network module 142 or stored in the memory 149 into an audio signal and output the audio signal as a sound. In addition, the audio output unit 143 may further provide an audio output (for example, a call signal received voice, or a message received voice) related to a specific function implemented by the terminal 140. The audio output unit 143 includes a loudspeaker, a buzzer, a receiver, and the like.

The input unit 144 is configured to receive audio or video signals. The input unit 144 may include a Graphics Processing Unit (GPU) 1441 and a microphone 1442. The graphics processing unit 1441 processes image data of a static picture or video obtained by an image capture apparatus (such as a camera) in a video capture mode or an image capture mode. A processed image frame may be displayed on the display unit 146. The image frame processed by the graphics processing unit 1441 may be stored in the memory 149 (or another storage medium) or sent by using the radio frequency unit 141 or the network module 142. The microphone 1442 may receive a sound and can process such sound into audio data. The processed audio data may be converted, in a phone calling mode, into a format that may be transmitted to a mobile communication base station by using the radio frequency unit 141 for output.

The terminal 140 further includes at least one sensor 145, for example, a light sensor, a motion sensor, and another sensor. Specifically, the light sensor includes an ambient light sensor and a proximity sensor. The ambient light sensor may adjust luminance of the display panel 1461 based on brightness of ambient light. The proximity sensor may turn off the display panel 1461 and/or backlight when the terminal 140 is moved to an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 145 may further include a fingerprint sensor, a pressure sensor, an iris sensor, a molecular sensor, a gyroscope, a barometer, a hygrometer, a thermometer, an infrared sensor, and the like. Details are not described herein.

The display unit 146 is configured to display information entered by a user or information provided for the user. The display unit 146 may include the display panel 1461, and the display panel 1461 may be configured in a form of a Liquid Crystal Display (LCD), an Organic Light-Emitting Diode (OLED), or the like.

The user input unit 147 may be configured to receive input digit or character information and generate key signal input related to user setting and function control of the terminal. Specifically, the user input unit 147 includes a touch panel 1471 and another input device 1472. The touch panel 1471 is also referred to as a touchscreen, and may collect a touch operation performed by the user on or near the touch panel 1471 (for example, an operation performed on or near the touch panel 1471 by the user by using any appropriate object or accessory such as a finger or a stylus). The touch panel 1471 may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information into touch point coordinates, sends the touch point coordinates to the processor 1410, and receives and executes a command sent by the processor 1410. In addition, the touch panel 1471 may be implemented by various types, such as a resistive type, a capacitive type, an infrared type, a surface acoustic wave type, or the like. The user input unit 147 may further include another input device 1472 in addition to the touch panel 1471. Specifically, the another input device 1472 may include, but is not limited to, a physical keyboard, function keys (such as a volume control key and a switch key), a trackball, a mouse, and a joystick. Details are not described herein.

Further, the touch panel 1471 can cover the display panel 1461. When detecting a touch operation on or near the touch panel, the touch panel 1471 transmits the touch operation to the processor 1410 to determine a type of a touch event. Then the processor 1410 provides corresponding visual output on the display panel 1461 based on the type of the touch event. In FIG. 14, the touch panel 1471 and the display panel 1461 are used as two independent components to implement input and output functions of the terminal. However, in some embodiments, the touch panel 1471 and the display panel 1461 may be integrated to implement the input and output functions of the terminal. This is not specifically limited herein.

The interface unit 148 is an interface connecting an external apparatus to the terminal 140. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 148 may be configured to receive an input (for example, data information or power) from an external apparatus and transmit the received input to one or more elements in the terminal 140, or transmit data between the terminal 140 and the external apparatus.

The memory 149 may be configured to store a software program as well as various kinds of data. The memory 149 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 149 may include a high-speed random access memory, and may further include a non-volatile memory, for example, at least one magnetic disk storage device, a flash memory device, or another volatile solid-state storage device.

The processor 1410 is a control center of the terminal, and connects all parts of the entire terminal by using various interfaces and lines. By running or executing a software program and/or a module stored in the memory 149 and invoking data stored in the memory 149, the processor 1410 performs various functions of the terminal and data processing, to perform overall monitoring on the terminal. The processor 1410 can include one or more processing units. For example, the processor 1410 can be integrated with an application processor and a modem processor. The application processor mainly processes the operating system, the user interface, applications, and the like. The modem processor mainly processes wireless communication. It can be understood that the modem processor may not be integrated into the processor 1410.

The terminal 140 may further include the power supply 1411 (such as a battery) that supplies power to each component. For example, the power supply 1411 may be logically connected to the processor 1410 by using a power management system, so as to implement functions such as charging, discharging, and power consumption management by using the power management system.

In addition, the terminal 140 includes some functional modules that are not shown. Details are not described herein.

Figure 15:
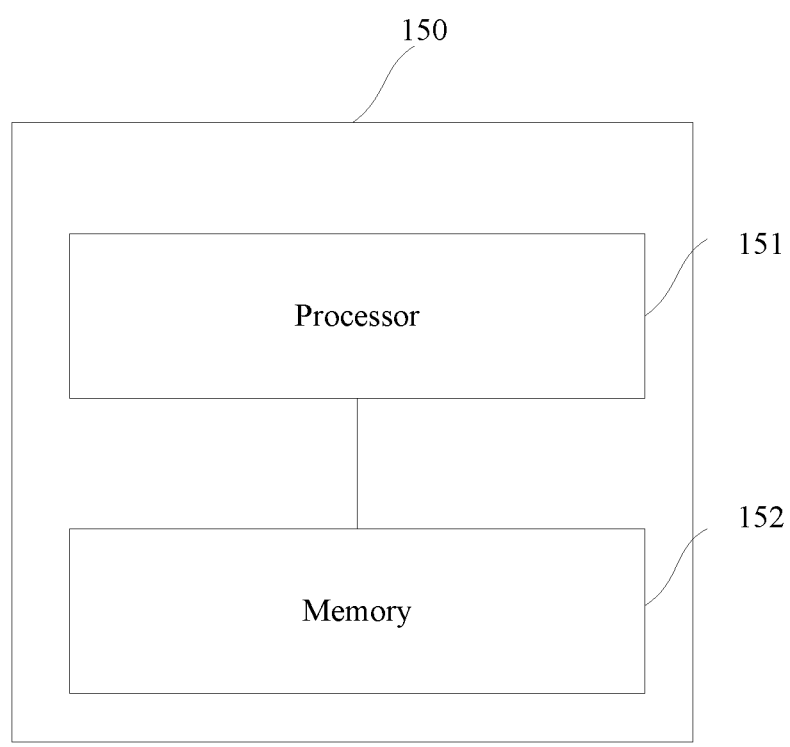
FIG. 15 is a schematic structural diagram of a terminal according to still another embodiment of the present disclosure.

Referring to FIG. 15, FIG. 15 is a schematic structural diagram of a terminal according to still another embodiment of the present disclosure. The terminal 154 includes: a processor 151 and a memory 152. In this embodiment of the present disclosure, the terminal 154 further includes: a computer program that is stored in the memory 152 and that can be run on the processor 151. When the computer program is executed by the processor 151, the following steps are performed.

Determine, according to at least one of a frequency domain resource of SCI and frequency domain resource indication information carried by the SCI, a frequency domain resource of a target resource indicated by the SCI.

Determine, according to at least one of a time domain resource of the SCI and time domain resource indication information carried by the SCI, a time domain resource of a target resource indicated by the SCI.

In some embodiments, when the computer program is executed by the processor 151, the following steps may be further performed.

The determining, according to at least one of a frequency domain resource of SCI and frequency domain resource indication information carried by the SCI, a frequency domain resource of a target resource indicated by the SCI includes:
   determining the frequency domain resource of the target resource according to the frequency resource of the SCI, information about a frequency domain position relationship between the frequency domain resource of the target resource and the frequency domain resource of the SCI, and a size of the frequency domain resource of the target resource.

In some embodiments, the information about a frequency domain position relationship is predefined or pre-configured.

In some embodiments, the information about a frequency domain position relationship includes one of the following:
   frequency domain positions of the frequency domain of the target resource and of the frequency domain resource of the SCI are the same; and
   a frequency domain offset value between the frequency domain resource of the target resource and the frequency domain resource of the SCI.

In some embodiments, the size of the frequency domain resource of the target resource is a predefined or pre-configured value, or is determined according to information about a relationship between the size of the frequency domain resource of the target resource and a size of the frequency domain resource of the SCI. The information about a relationship between the size of the frequency domain resource of the target resource and the size of the frequency domain resource of the SCI is predefined or pre-configured.

In some embodiments, the information about a relationship between the size of the frequency domain resource of the target resource and the size of the frequency domain resource of the SCI includes one of the following:
   the size of the frequency domain resource of the target resource is equal to the size of the frequency domain resource of the SCI; the size of the frequency domain resource of the target resource and the size of the frequency domain resource of the SCI are in a scaling relationship according to a specified scaling factor; and
   a specified size difference is set between the size of the frequency domain resource of the target resource and the size of the frequency domain resource of the SCI.

In some embodiments, the target resource indicated by the SCI includes the resource of the currently transmitted PSSCH indicated by the SCI and the reserved resource. The reserved resource is used for transmission of at least one of the PSCCH and the PSSCH.

In some embodiments, the frequency domain resource indication information includes at least one of the following:
   a start position of a frequency domain resource of the currently transmitted PSSCH;
   an end position of a frequency domain resource of the currently transmitted PSSCH;
   a frequency domain center position of a frequency domain resource of the currently transmitted PSSCH;
   a size of a frequency domain resource of the currently transmitted PSSCH;
   a start position of a frequency domain resource of the reserved resource;
   an end position of a frequency domain resource of the reserved resource;
   a frequency domain center position of the reserved resource;
   a size of a frequency domain resource of the reserved resource;
   a specified scaling factor of a size of the frequency domain resource of the target resource;
   a specified size difference between sizes of the frequency domain resource of the target resource;
   a specified scaling factor of a size of a frequency domain resource of the reserved resource; or
   a specified size difference between sizes of a frequency domain resource of the reserved resource.

In some embodiments, when the computer program is executed by the processor 151, the following steps may be further performed.

The determining, according to at least one of a frequency domain resource of SCI and frequency domain resource indication information carried by the SCI, a frequency domain resource of a target resource indicated by the SCI includes:
   determining, according to the frequency domain resource indication information carried by the SCI and at least one of the frequency domain resource of the SCI and information about a relationship of sizes of the frequency domain resource of the target resource, the frequency domain resource of the target resource indicated by the SCI.

The information about a relationship between sizes of the frequency domain resource of the target resource includes at least one of the following:
   sizes of the frequency domain resource of the target resource are scaled proportionally in time sequence;
   sizes of the frequency domain resource of the target resource are set with an equal size difference in time sequence;
   sizes of the frequency domain resource of the target resource are the same; or
   sizes of the frequency domain resource of the reserved resource are the same.

In some embodiments, the target resource indicated by the SCI includes the resource of the currently transmitted PSSCH indicated by the SCI and the reserved resource. The reserved resource is used for transmission of at least one of the PSCCH and the PSSCH.

The frequency domain resource indication information includes: first frequency domain resource indication information for indicating the resource of the currently transmitted PSSCH, and/or second frequency domain resource indication information for indicating the reserved resource.

The number of pieces of the first frequency domain resource indication information is 1, and the number of pieces of the second frequency domain resource indication information is N−1, where N is the number of pieces of frequency domain resource indication information carried in the SCI, and N is a positive integer greater than or equal to 2.

The number of the reserved resources is K−1, where K is the number of the target resources indicated by the SCI, and K is a positive integer greater than or equal to 2.

The N−1 pieces of the second frequency domain resource indication information and the K−1 pieces of the reserved resources have a one-to-one or many-to-one relationship.

In some embodiments, the SCI includes first-stage SCI and second-stage SCI.

The first frequency domain resource indication information is carried in the second-stage SCI, and the second frequency domain resource indication information is carried in the first-stage SCI; or the first frequency domain resource indication information and the second frequency domain resource indication information are both carried in the second-stage SCI; or the first frequency domain resource indication information and the second frequency domain resource indication information are both carried in the first-stage SCI.

In some embodiments, the first frequency domain resource indication information is the $n^{th}$ piece of frequency domain resource indication information carried by the SCI.

The value of n is indicated by the SCI, or configured, pre-configured, or predefined.

In some embodiments, the target resource indicated by the SCI includes the resource of the currently transmitted PSSCH indicated by the SCI and the reserved resource. The reserved resource is used for transmission of at least one of the PSCCH and the PSSCH.

One piece of the frequency domain resource indication information, is used to indicate the resource of the currently transmitted PSSCH and the reserved resource.

In some embodiments, the SCI includes the first-stage SCI and the second-stage SCI, and the frequency domain resource indication information is carried in the first-stage SCI.

In some embodiments, when the computer program is executed by the processor 151, the following steps may be further performed.

The determining, according to at least one of a time domain resource of the SCI and time domain resource indication information carried by the SCI, a time domain resource of a target resource indicated by the SCI includes:
  determining the time domain resource of the target resource according to the time domain resource of the SCI and information about a relationship between the time domain resource of the target resource and the time domain resource of the SCI.

In some embodiments, the information about a relationship between the time domain resource of the target resource and the time domain resource of the SCI includes one of the following:
  the time domain resource of the target resource and the time domain resource of the SCI are located in the same time slot;
  the time domain resource of the target resource occupies a plurality of time slots, and the time domain resource of the SCI is located in at least one of the plurality of time slots;
  the time domain resource of the SCI is located in a pattern of the time domain resource of the target resource; or
  a time domain offset between a time domain position of the target resource and a time domain position of the time domain resource of the SCI.

In some embodiments, the target resource indicated by the SCI includes the resource of the currently transmitted PSSCH indicated by the SCI and the reserved resource. The reserved resource is used for transmission of at least one of the PSCCH and the PSSCH.

The time domain resource indication information includes at least one of the following:
  a time domain interval between a time domain resource of the reserved resource and the time domain resource of the resource of the currently transmitted PSSCH;
  a time domain interval between a time domain resource of the reserved resource and the time domain resource of the SCI;
  a time domain interval between two of the target resources; a time domain interval between two of the reserved resources;
  a reserved period of a time domain resource of the resource of the currently transmitted PSSCH; or
  a reserved period of the time domain resource of the target resource.

In some embodiments, when the computer program is executed by the processor 151, the following steps may be further performed.

The determining, according to at least one of a frequency domain resource of SCI and frequency domain resource indication information carried by the SCI, a frequency domain resource of a target resource indicated by the SCI; and determining, according to at least one of a time domain resource of the SCI and time domain resource indication information carried by the SCI, a time domain resource of the target resource indicated by the SCI includes:
  if an initial transmission and retransmission indicator carried by the SCI indicates that data on the target resource is initially transmitted data, or a HARQ process ID carried in the SCI is the same as a HARQ process ID carried in the stored SCI, and a NDI carried in the SCI is flipped, determining, according to the frequency domain resource of the SCI, the frequency domain resource of the target resource indicated by the SCI, and determining, according to the time domain resource of the SCI, the time domain resource of the target resource indicated by the SCI. The target resource is a resource of the currently transmitted PSSCH or the reserved resource.

In some embodiments, the SCI includes the first-stage SCI. The first-stage SCI carries the initial transmission and retransmission indicator, or carries the HARQ process ID and NDI.

In some embodiments, when the computer program is executed by the processor 151, the following steps may be further performed.

The determining, according to at least one of a frequency domain resource of SCI and frequency domain resource indication information carried by the SCI, a frequency domain resource of a target resource indicated by the SCI; and determining, according to at least one of a time domain resource of the SCI and time domain resource indication information carried by the SCI, a time domain resource of the target resource indicated by the SCI includes:

if the initial transmission and retransmission indication carried by the SCI indicates that the data on the target resource is retransmitted data, or the HARQ process ID carried in the SCI is the same as a HARQ process ID carried in the stored SCI, and a NDI carried in the SCI is not flipped, determining, according to the frequency domain resource indication information carried by the SCI, the frequency domain resource of the target resource indicated by the SCI, and determining, according to the time domain resource indication information carried by the SCI or the time domain resource of the SCI, the time domain resource of the target resource indicated by the SCI;

or determining, according to the frequency domain resource indication information carried by the SCI or the frequency domain resource of the SCI, the frequency domain resource of the target resource indicated by the SCI, and determining, according to the time domain resource indication information carried by the SCI, the time domain resource of the target resource indicated by the SCI.

The target resource includes a resource of the currently transmitted PSSCH and the reserved resource.

In some embodiments, when the computer program is executed by the processor 151, the following steps may be further performed.

The determining, according to the frequency domain resource indication information carried by the SCI further, the frequency domain resource of the target resource indicated by the SCI includes:

if the data transmitted through the currently transmitted PSCCH is retransmitted data, determining a transport block size of the retransmitted data according to a MCS carried by the SCI and a size of the frequency domain resource of initially transmitted data.

In some embodiments, the MCS carried by the SCI is the same as a MCS of the initially transmitted data.

In some embodiments, when the computer program is executed by the processor 151, the following steps may be further performed.

The size of the frequency domain resource of the initially transmitted data is determined in the following ways.

The size of the frequency domain resource of the initially transmitted data is obtained according to the size of the frequency domain resource of the currently transmitted PSSCH carried by the SCI, a relationship between the frequency domain resource of the currently transmitted PSSCH and the reserved resource, and a retransmission times indicator or a transmission times indicator carried by the SCI.

An embodiment of the present disclosure further provides a computer-readable storage medium. The computer-readable storage medium stores a computer program, and when the computer program is executed by a processor, the processes of the foregoing embodiments of the method for determining a sidelink resource are implemented and a same technical effect can be achieved. To avoid repetition, details are not described herein again. The computer-readable storage medium may be a Read-Only Memory (ROM), a Random Access Memory (RAM), a magnetic disk, a compact disc, or the like.

It should be noted that in this specification, the terms "comprise", "include", and any other variants thereof are intended to cover non-exclusive inclusion, so that a process, a method, an article, or an apparatus that includes a series of elements not only includes those elements, but also includes other elements not expressly listed, or further includes elements inherent to this process, method, article, or apparatus. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is an exemplary implementation. Based on such understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

It can be understood that the embodiments described in some embodiments of the present disclosure may be implemented by hardware, software, firmware, middleware, a microcode, or a combination thereof. For implementation with hardware, a module, a unit, a sub-module, a sub-unit, or the like can be implemented in one or more Application Specific Integrated Circuits (ASICs), Digital Signal Processors (DSPs), DSP Devices (DSPDs), Programmable Logic Devices (PLDs), Field-Programmable Gate Arrays (FPGAs), general processors, controllers, micro-controllers, microprocessors, and electronic units for implementing the functions of the present disclosure, or their combinations.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skill in the art may make many forms without departing from the aims of the present disclosure and the protection scope of claims, all of which fall within the protection scope of the present disclosure.

The invention claimed is:

1. A method for determining a sidelink resource, wherein the method is executed by a terminal and comprises:
    determining, according to frequency domain resource indication information carried by Sidelink Control Information (SCI), a frequency domain resource of a target resource indicated by the SCI,
    wherein:
        the frequency domain resource indication information comprises; first frequency domain resource indication information for indicating a resource of a currently transmitted Physical Sidelink Shared Channel (PSSCH), and second frequency domain resource indication information for indicating a reserved resource; and the number of pieces of the first frequency domain resource indication information is 1, and the number of pieces of the second frequency domain resource indication information is N−1, wherein N is the number of pieces of frequency domain resource indication information carried in the SCI, and N is a positive integer greater than 2; and determining, according to at least one of a time domain resource of the SCI and time domain resource indication information carried by the SCI, a time domain resource of a target resource indicated by the SCI.

2. The method according to claim 1, wherein determining, according to the frequency domain resource indication information carried by the SCI, the frequency domain resource of the target resource indicated by the SCI comprises:

determining the frequency domain resource of the target resource according to a frequency domain resource of the SCI, information about a frequency domain position relationship between the frequency domain resource of the target resource and the frequency domain resource of the SCI, and a size of the frequency domain resource of the target resource.

3. The method according to claim 2, wherein the information about the frequency domain position relationship comprises one of the following:

frequency domain positions of the frequency domain of the target resource and of the frequency domain resource of the SCI are the same; or a frequency domain offset value between the frequency domain resource of the target resource and the frequency domain resource of the SCI.

4. The method according to claim 2, wherein the size of the frequency domain resource of the target resource is a predefined or pre-configured value, or is determined according to information about a relationship between the size of the frequency domain resource of the target resource and a size of the frequency domain resource of the SCI.

5. The method according to claim 4, wherein the information about the relationship between the size of the frequency domain resource of the target resource and the size of the frequency domain resource of the SCI comprises one of the following:

the size of the frequency domain resource of the target resource is equal to the size of the frequency domain resource of the SCI;

the size of the frequency domain resource of the target resource and the size of the frequency domain resource of the SCI are in a scaling relationship according to a specified scaling factor; or a specified size difference is set between the size of the frequency domain resource of the target resource and the size of the frequency domain resource of the SCI.

6. The method according to claim 1, wherein the target resource indicated by the SCI comprises the resource of the currently transmitted PSSCH indicated by the SCI and the reserved resource, wherein the reserved resource is used for transmission of the currently transmitted PSSCH.

7. The method according to claim 6, wherein determining, according to the frequency domain resource indication information carried by the SCI, the frequency domain resource of the target resource indicated by the SCI comprises:

determining, according to the frequency domain resource indication information carried by the SCI and at least one of a frequency domain resource of the SCI or information about a relationship of sizes of the frequency domain resource of the target resource, the frequency domain resource of the target resource indicated by the SCI, wherein the information about the relationship between the sizes of the frequency domain resource of the target resource comprises at least one of the following:

sizes of the frequency domain resource of the target resource are scaled proportionally in time sequence;

sizes of the frequency domain resource of the target resource are set with an equal size difference in time sequence;

sizes of the frequency domain resource of the target resource are the same; or sizes of the frequency domain resource of the reserved resource are the same.

8. The method according to claim 1, wherein the SCI comprises first-stage SCI and second-stage SCI:

the first frequency domain resource indication information and the second frequency domain resource indication information are both carried in the first-stage SCI.

9. The method according to claim 6, wherein the time domain resource indication information comprises at least one of the following:

a time domain interval between a time domain resource of the reserved resource and the time domain resource of the resource of the currently transmitted PSSCH;

a time domain interval between a time domain resource of the reserved resource and the time domain resource of the SCI;

a time domain interval between two of the target resources;

a time domain interval between two of the reserved resources;

a reserved period of a time domain resource of the resource of the currently transmitted PSSCH; or a reserved period of the time domain resource of the target resource.

10. The method according to claim 6, wherein determining, according to the frequency domain resource indication information carried by the SCI, the frequency domain resource of the target resource indicated by the SCI; and determining, according to the at least one of the time domain resource of the SCI and the time domain resource indication information carried by the SCI, the time domain resource of the target resource indicated by the SCI comprises:

when an initial transmission and retransmission indicator carried by the SCI indicates that data on the target resource is retransmitted data, or a Hybrid Automatic Repeat reQuest (HARQ) process ID carried in the SCI is the same as a HARQ process ID carried in the stored SCI, and a New Data Indicator (NDI) carried in the SCI is not flipped:

determining, according to the frequency domain resource indication information carried by the SCI, the frequency domain resource of the target resource indicated by the SCI; and determining, according to the time domain resource indication information carried by the SCI or the time domain resource of the SCI, the time domain resource of the target resource indicated by the SCI;

or determining, according to the frequency domain resource indication information carried by the SCI or a frequency domain resource of the SCI, the frequency domain resource of the target resource indicated by the SCI, and determining, according to the time domain resource indication information carried by the SCI, the time domain resource of the target resource indicated by the SCI.

11. The method according to claim 1, wherein determining, according to the time domain resource indication information carried by the SCI, the time domain resource of the target resource indicated by the SCI comprises:
determining the time domain resource of the target resource according to the time domain resource of the SCI and information about a relationship between the time domain resource of the target resource and the time domain resource of the SCI.

12. The method according to claim 11, wherein the information about a relationship between the time domain resource of the target resource and the time domain resource of the SCI comprises one of the following:
the time domain resource of the target resource and the time domain resource of the SCI are located in the same time slot;
the time domain resource of the target resource occupies a plurality of time slots, and the time domain resource of the SCI is located in at least one of the plurality of time slots;
the time domain resource of the SCI is located in a pattern of the time domain resource of the target resource; or
a time domain offset between a time domain position of the target resource and a time domain position of the time domain resource of the SCI.

13. The method according to claim 1, wherein determining, according to the frequency domain resource indication information carried by the SCI, the frequency domain resource of the target resource indicated by the SCI; and determining, according to the at least one of the time domain resource of the SCI and the time domain resource indication information carried by the SCI, the time domain resource of the target resource indicated by the SCI comprises:
when an initial transmission and retransmission indicator carried by the SCI indicates that data on the target resource is initially transmitted data, or a Hybrid Automatic Repeat reQuest (HARQ) process ID carried in the SCI is the same as a HARQ process ID carried in the stored SCI, and a New Data Indicator (NDI) carried in the SCI is flipped: determining, according to a frequency domain resource of the SCI, the frequency domain resource of the target resource indicated by the SCI, and determining, according to the time domain resource of the SCI, the time domain resource of the target resource indicated by the SCI,
wherein the SCI comprises first-stage SCI, wherein the first-stage SCI carries the initial transmission and retransmission indicator or carries the HARQ process ID and NDI.

14. A terminal, comprising: a processor, a memory, and a computer program that is stored in the memory and that can be run on the processor, wherein the computer program, when executed by the processor, causes the processor to implement a method for determining a sidelink resource, the method comprising:
determining, according to frequency domain resource indication information carried by Sidelink Control Information (SCI), a frequency domain resource of a target resource indicated by the SCI,
wherein:
the frequency domain resource indication information comprises: first frequency domain resource indication information for indicating a resource of a currently transmitted Physical Sidelink Shared Channel (PSSCH), and second frequency domain resource indication information for indicating a reserved resource; and
the number of pieces of the first frequency domain resource indication information is 1, and the number of pieces of the second frequency domain resource indication information is N−1, wherein N is the number of pieces of frequency domain resource indication information carried in the SCI, and N is a positive integer greater than 2;
and
determining, according to at least one of a time domain resource of the SCI and time domain resource indication information carried by the SCI, a time domain resource of a target resource indicated by the SCI.

15. A non-transitory computer-readable storage medium, storing a program that, when executed by a processor, causes the processor to implement a method for determining a sidelink resource, the method comprises:
determining, according to frequency domain resource indication information carried by Sidelink Control Information (SCI), a frequency domain resource of a target resource indicated by the SCI,
wherein;
the frequency domain resource indication information comprises: first frequency domain resource indication information for indicating a resource of a currently transmitted Physical Sidelink Shared Channel (PSSCH), and second frequency domain resource indication information for indicating a reserved resource; and
the number of pieces of the first frequency domain resource indication information is 1, And the number of pieces of the second frequency domain resource indication information is N−1, wherein N is the number of pieces of frequency domain resource indication information carried in the SCI, and N is a positive integer greater than 2;
and
determining, according to at least one of a time domain resource of the SCI and time domain resource indication information carried by the SCI, a time domain resource of a target resource indicated by the SCI.

16. The method according to claim 6, wherein the frequency domain resource indication information comprises at least one of the following:
a start position of a frequency domain resource of the currently transmitted PSSCH;
a size of a frequency domain resource of the currently transmitted PSSCH;
a start position of a frequency domain resource of the reserved resource; or
a size of a frequency domain resource of the reserved resource.

17. The terminal according to claim 14, wherein determining, according to the frequency domain resource indication information carried by the SCI, the frequency domain resource of the target resource indicated by the SCI comprises:
determining the frequency domain resource of the target resource according to a frequency domain resource of the SCI, information about a frequency domain position relationship between the frequency domain resource of the target resource and the frequency domain resource of the SCI, and a size of the frequency domain resource of the target resource.

18. The terminal according to claim 17, wherein the information about the frequency domain position relationship comprises one of the following:
- frequency domain positions of the frequency domain of the target resource and of the frequency domain resource of the SCI are the same; or
- a frequency domain offset value between the frequency domain resource of the target resource and the frequency domain resource of the SCI.

19. The terminal according to claim 17, wherein the size of the frequency domain resource of the target resource is a predefined or pre-configured value, or is determined according to information about a relationship between the size of the frequency domain resource of the target resource and a size of the frequency domain resource of the SCI.

20. The terminal according to claim 19, wherein the information about the relationship between the size of the frequency domain resource of the target resource and the size of the frequency domain resource of the SCI comprises one of the following:
- the size of the frequency domain resource of the target resource is equal to the size of the frequency domain resource of the SCI;
- the size of the frequency domain resource of the target resource and the size of the frequency domain resource of the SCI are in a scaling relationship according to a specified scaling factor; or
- a specified size difference is set between the size of the frequency domain resource of the target resource and the size of the frequency domain resource of the SCI.

* * * * *